United States Patent
Maturi et al.

(10) Patent No.: US 12,314,696 B2
(45) Date of Patent: May 27, 2025

(54) MULTI-CLOUD LICENSED SOFTWARE DEPLOYMENT

(71) Applicant: Nutanix, Inc., San Jose, CA (US)

(72) Inventors: Mohan Maturi, San Jose, CA (US);
Nitin Parab, Palo Alto, CA (US);
Vidhi Taneja, Cupertino, CA (US);
Binny Sher Gill, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 18/531,586

(22) Filed: Dec. 6, 2023

(65) Prior Publication Data
US 2024/0241706 A1    Jul. 18, 2024

Related U.S. Application Data

(63) Continuation of application No. 18/054,887, filed on Nov. 11, 2022, now Pat. No. 11,886,851, which is a
(Continued)

(51) Int. Cl.
*G06F 9/455*    (2018.01)
*G06F 8/60*    (2018.01)
(Continued)

(52) U.S. Cl.
CPC .......... *G06F 8/60* (2013.01); *G06F 9/45533* (2013.01); *G06F 21/105* (2013.01); *H04L 67/34* (2013.01); *H04L 67/10* (2013.01)

(58) Field of Classification Search
CPC ...... G06F 8/60; G06F 9/45533; G06F 21/105; G06F 21/107; G06F 21/604; G06F 21/53;
(Continued)

(56) References Cited

U.S. PATENT DOCUMENTS

| | | | |
|---|---|---|---|
| 6,502,079 B1 | 12/2002 | Ball et al. | |
| 7,949,752 B2 | 5/2011 | Lange et al. | |

(Continued)

FOREIGN PATENT DOCUMENTS

| | | |
|---|---|---|
| CN | 113553552 | 10/2021 |
| CN | 113553552 A | 10/2021 |

(Continued)

OTHER PUBLICATIONS

"Licensing Operations," VMWare Docs, URL: https://docs.vmware.com/en/VMware-Smart-Assurance/10.1.12/vsa-mnr-installation-and-configuration-10112/GUID-AB1831B4-7A8D-4403-B7AD-621B4E3833FA.html, dated May 31, 2019.
(Continued)

*Primary Examiner* — Thuy Dao
(74) *Attorney, Agent, or Firm* — Vista IP Law Group, LLP

(57) ABSTRACT

Methods, systems, and computer program products for flexible virtualization system deployment into different cloud computing environments. A set of floating licenses to virtualization system software components is established. The set of floating licenses are configured to permit usage of the virtualization system software components on different cloud computing infrastructures. Workload parameters of a workload to be deployed to one of the different cloud computing infrastructures is considered with respect to cloud attributes corresponding to the different cloud computing infrastructures. One or more candidate target cloud computing infrastructures are selected based upon a comparison between workload attributes of a computing workload and cloud attributes of the candidate target cloud computing infrastructures. Virtualization system software components are deployed into the selected target cloud computing infrastructures. Licenses to the virtualization
(Continued)

| Column1 | Column2 | Column3 |
|---|---|---|
| Virtual Entity | Metering Model | Billing Model |
| Virtual Machine | Time * resources, where resources include number of cores | Bill customer at usage * rate, subject to peak pricing premium |
| Virtualized Computing Cluster (on-demand size) | Time * resources, where resources include number of nodes | Bill customer at usage * rate, subject to peak pricing premium |
| Virtualized Computing Cluster (pre-sized) | Time * resources, where resources are limited to a predetermined number of nodes and/or a type of node | Customer has already paid for a predetermined number and type of nodes |
| Virtualized Storage Capacity | Time * storage usage, where usage is an average daily amount of allocated storage | Time * guaranteed capacity * rate, subject to overage premium | system software components can float between any combination of different cloud computing infrastructures, including floating the licenses between private clouds and public clouds.

24 Claims, 23 Drawing Sheets

Related U.S. Application Data continuation of application No. 17/334,940, filed on May 31, 2021, now Pat. No. 11,507,356.

(60) Provisional application No. 62/705,920, filed on Jul. 22, 2020.

(51) Int. Cl.
| | |
|---|---|
| G06F 9/445 | (2018.01) |
| G06F 15/173 | (2006.01) |
| G06F 21/10 | (2013.01) |
| G06Q 30/00 | (2023.01) |
| H04L 29/06 | (2006.01) |
| H04L 67/00 | (2022.01) |
| H04L 67/10 | (2022.01) |

(58) Field of Classification Search
CPC .... G06F 21/6218; G06F 21/73; G06F 9/5088; G06F 21/71; G06F 21/645; G06F 9/45558; G06F 9/5077; G06F 9/547; G06F 9/5083; H04L 67/34; H04L 67/10; H04L 67/51; H04L 41/40; H04L 67/1021; H04L 41/5051
See application file for complete search history.

(56) References Cited

U.S. PATENT DOCUMENTS

| | | |
|---|---|---|
| 8,380,837 B2 | 2/2013 | Dawson et al. |
| 8,549,518 B1 | 10/2013 | Aron et al. |
| 8,601,473 B1 | 12/2013 | Aron et al. |
| 8,646,098 B2 | 2/2014 | Vedantam et al. |
| 8,850,130 B1 | 9/2014 | Aron et al. |
| 8,909,785 B2 * | 12/2014 | Franco ............... H04L 67/1097 718/1 |
| 9,009,079 B2 | 4/2015 | D'alo et al. |
| 9,772,866 B1 | 9/2017 | Aron et al. |
| 9,977,880 B2 | 5/2018 | Chambers et al. |
| 10,554,525 B2 | 2/2020 | Abrams et al. |
| 11,507,643 B2 | 11/2022 | Bhandaru et al. |
| 11,562,050 B2 * | 1/2023 | Torres ................ H04L 9/3263 |
| 12,045,320 B2 * | 7/2024 | Patange ................ H04W 4/24 |
| 2011/0047624 A1 | 2/2011 | Vedantam et al. |
| 2011/0213691 A1 | 9/2011 | Ferris et al. |
| 2011/0213884 A1 | 9/2011 | Ferris et al. |
| 2013/0262250 A1 * | 10/2013 | Lingafelt .............. G06Q 30/06 705/26.1 |
| 2015/0332025 A1 * | 11/2015 | Nakamura ............ G06F 21/105 726/26 |
| 2016/0078202 A1 | 3/2016 | Abuelsaad et al. |
| 2020/0344229 A1 * | 10/2020 | Srivastava ............ G06F 21/105 |
| 2021/0004250 A1 * | 1/2021 | Arya ................... G06F 9/45558 |

FOREIGN PATENT DOCUMENTS

| | | |
|---|---|---|
| WO | WO2013157124 | 10/2013 |
| WO | WO2013157124 A1 | 10/2013 |

OTHER PUBLICATIONS

"Licensing," VMWare Docs, URL: https://docs.vmware.com/en/VMware-Cloud-Well-Architected-Framework/services/vmcwaf-avs/GUID-9B8C2D7F-DF6F-4D06-8CBE-7411B6631F70.html?hWord=N4lghgNiBclQIgYwKYDsDOyQF8g, dated Apr. 17, 2023.

"Synchronize licenses on multiple hosts," VMWare Docs, URL: https://docs.vmware.com/en/VMware-Smart-Assurance/10.1.12/vsa-mnr-installation-and-configuration-10112/GUID-BA975B6C-2443-45B4-A193-72F63C06E757.html, dated May 31, 2019.

Prasad, K., "VMware by Broadcom dramatically simplifies offer lineup and licensing model," Broadcom B-Connected Blog, dated Dec. 11, 2023.

Singh, H., "Embracing Change with VMware vSphere Foundation," VMWare vSphere Blog, dated Jan. 17, 2024.

"Auto Entitlement Policy," VMWare, URL: https://developer.vmware.com/apis/csp/csp-iam/latest/auto-entitlement-policy/, dated Jan. 25, 2024.

"About the Workload Placement Engine," VMWare Docs, URL: https://docs.vmware.com/en/VMware-Cloud-Director/10.4/VMware-Cloud-Director-Service-Provider-Admin-Portal-Guide/GUID-D1D57869-E7BE-4CB1-8063-A5C46D257075.html, dated Jun. 28, 2023.

"Understanding VM Sizing, VM Placement, and vGPU Policies," VMWare Docs, URL: https://docs.vmware.com/en/VMware-Cloud-Director/10.4/VMware-Cloud-Director-Service-Provider-Admin-Portal-Guide/GUID-38C72A2B-B5CA-475C-A154-ACD4C4C475CC.html, dated Jun. 28, 2022.

Uenishi, T., "Introducing VMware vCloud Suite 7 and vRealize Suite 7," VMWare Cloud Management, dated Feb. 10, 2016.

"vRealize Suite Overview: vRealize Suite 2017," VMWare, copyright 2019.

Shah, V., "Introducing VMware Cloud Assembly, VMware Code Stream and VMware Service Broker," VMWare Cloud Management, dated Aug. 27, 2018.

"Using and Managing VMware Cloud Assembly," VMware Cloud Assembly, dated May 17, 2019.

"About the Workload Placement Engine," VMWare Docs, URL: https://docs.vmware.com/en/VMware-Cloud-Director/10.3/VMware-Cloud-Director-Service-Provider-Admin-Portal-Guide/GUID-D1D57869-E7BE-4CB1-8063-A5C46D257075.html, dated Sep. 23, 2022.

"VMware vSphere & VMware vSphere+Compute Virtualization," VMWare White Paper, dated Jun. 2023.

"VMware vSphere® Product Line Comparison," VMWare, dated Mar. 2024.

Singh, H., VMware vSphere+: Introducing The Enterprise Workload Platform, VMWare vSphere Blog, dated Jun. 28, 2022.

He, W., "VMware vSphere+ and VMware vSAN+ Now Generally Available," VMware vSphere Blog, dated Jul. 12, 2022.

"vSphere+ Requirements," VMWare Docs, URL: https://docs.vmware.com/en/VMware-vSphere+/services/vsphereplus-getting-started/GUID-E64F5E6C-E4A3-411D-9787-161D24E73D04.html#GUID-E64F5E6C-E4A3-411D-9787-161D24E73D04\, dated Dec. 11, 2023.

"Subscribe Your vCenter to vSphere+," VMWare Docs, URL: https://docs.vmware.com/en/VMware-vSphere+/services/vsphereplus-getting-started/GUID-450DE67B-1A89-4890-97CD-F116BFD38801.html, dated Dec. 8, 2023.

"Licensing and Subscription in vSphere," VMWare Docs, URL: https://docs.vmware.com/en/VMware-vSphere/8.0/vsphere-vcenter-esxi-management/GUID-710CD935-DBF4-4AF6-A4F7-ED35E552DE4C.html, dated Mar. 26, 2024.

"Move a Virtual Machine Out of a Cluster," VMWare Docs, dated May 31, 2019.

"View Subscriptions," VMWare Docs, URL: https://docs.vmware.com/en/VMware-vSphere+/services/vsphereplus-using-managing/GUID-EDFE6961-ED87-4570-81D6-834617C24A3F.html, dated Jun. 27, 2023.

"Auto Entitlement Policy APIs," Broadcom Developer Portal, URL: https://developer.broadcom.com/xapis/identity-and-access-management-cloud-services-platform/latest/auto-entitlement-policy/, copyright 2024.

"License Calculator for VMware Cloud Foundation, VMware vSphere Foundation and VMware vSAN," Broadcom, dated Feb. 12, 2024.

(56) References Cited

OTHER PUBLICATIONS

Lam, W., "What's in the new VMware vSphere Foundation (VVF) and VMware Cloud Foundation (VCF) offers?," WilliamLam, URL: https://williamlam.com/2024/01/whats-in-the-new-vmware-vsphere-foundation-vvf-and-vmware-cloud-foundation-vcf-offers.html, dated Jan. 8, 2024.
Saran, C., "Broadcom drops VMware perpetual licences and support," TechTarget—ComputerWeekly.com, dated Dec. 12, 2023.
Walsworth, R., "VMware End Of Availability of Perpetual Licensing and SaaS Services," VMware Cloud Foundation (VCF) Blog, dated Jan. 22, 2024.
Tarnawski, P., "Broadcom's VMware Streamlines Product Range and Adopts New Licensing Approach," dated Dec. 20, 2023.
"View license information," VMWare Docs, URL: https://docs.vmware.com/en/VMware-Smart-Assurance/10.1.12/vsa-mnr-installation-and-configuration-10112/GUID-079D480C-5028-404B-A075-1FE1D61E585B.html, dated May 31, 2019.
"Licensing," VMWare Docs, URL: https://docs.vmware.com/en/VMware-Smart-Assurance/10.1.12/vsa-mnr-installation-and-configuration-10112/GUID-4A5DD2F2-527F-45C3-8556-1BFA0C8EF1EF.html?hWord=N4lghgNiBclQIgYwKYDsDOyQF8g, dated May 19, 2021.
"License Settings," VMWare Docs, URL https://docs.vmware.com/en/VMware-Mirage/5.9.1/com.vmware.mirage.webmanagement/GUID-A2BEBOF3-65E7-4900-B974-226E0E56DB59.html?hWord=N4lghgNiBclQIgYwKYDsDOyQF8g, dated Jun. 20, 2016.
"How to buy VMware Products from the VMware Online Store," Broadcom, URL: https://knowledge.broadcom.com/external/article?legacyId=2033704, dated Nov. 15, 2022.
"VMware License Transfer and Account Change Processes," VMWare Docs, URL: https://www.vmware.com/support/policies/licensingpolicies.html, date found via Google as 2011.
"VMware vRealize Suite and vCloud Suite," VMWare White Paper, dated Jan. 2019.
"VMWare Portable License Unit," VMWare Executive Summary, date found via Google as 2014.
"Enable Workload Management with vSphere Networking," VMWare Docs, URL: https://docs.vmware.com/en/VMware-vSphere/7.0/vmware-vsphere-with-tanzu/GUID-8D7D292B-43E9-4CB8-9E20-E4039B80BF9B.html, dated Jun. 20, 2023.
"Software Licensing," Revenera, URL: https://www.revenera.com/software-monetization/products/software-licensing, date found via Google as May 28, 2020.
"Floating license," IBM, dated Mar. 3, 2021.
"Enabling floating licenses," IBM, dated Mar. 3, 2021.
"Working with Kubernetes clusters and namespaces in Cloud Assembly," VMWare Docs, URL: https://docs.vmware.com/en/vRealize-Automation/8.11/Using-and-Managing-Cloud-Assembly/GUID-8B5A6EFF-2C6F-4DDB-B44A-A2FDCD6D8362.html, dated Dec. 1, 2022.
McClanahan, C., "Kubernetes Namespace Management in Cloud Assembly," VMware Cloud Management, dated Sep. 19, 2019.
Bright, S., "Getting Started with vRealize Automation 8.0 Cloud Assembly," VMware Aria Automation, dated Nov. 27, 2019.
"VMware vRealize Suite and vCloud Suite 2019: Licensing, pricing and packaging," VMWare White Paper, dated Aug. 2020.
"VMware vRealize Suite 2017 Release Notes," VMWare Docs, URL: https://docs.vmware.com/en/vRealize-Suite/2017/rn/vrealize-suite-2017-release-notes.html#new, dated Sep. 19, 2017.
Roberts, A., et al., "Introduction to the vCloud Architecture Toolkit for VMware Cloud Providers," Version 2.9, VMware vCloud® Architecture Toolkit™ for Service Providers, dated Jan. 2018.
Kutsevol et al., Analytical Study of License-Assisted Access in 5G Networks, 9 pages (Year: 2019).
Notice of Allowance for U.S. Appl. No. 17/334,940 dated Jul. 14, 2022.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Poitras, Steven. "The Nutanix Bible" (Jul. 9, 2019), from https://nutanixbible.com/ (Publication date based on indicated capture date by Archive.org; first publication date unknown).
Poitras, Steven. "The Nutanix Bible" (Feb. 3, 2020), from https://nutanixbible.com/ (Publication date based on indicated capture date by Archive.org; first publication date unknown).
Poitras, Steven. "The Nutanix Bible" (Aug. 1, 2020), from https://nutanixbible.com/ (Publication date based on indicated capture date by Archive.org; first publication date unknown).
Poitras, Steven. "The Nutanix Bible" (Jan. 30, 2021), from https://nutanixbible.com/ (Publication date based on indicated capture date by Archive.org; first publication date unknown).
Cano, I et al., "Curator: Self-Managing Storage for Enterprise Clusters", *14th USENIX Symposium on Networked Systems Design and Implementation, NSDI '17*, (Mar. 27, 2017).
"License Mobility," Amazon Web Services, date found via Internet Archive as Mar. 3, 2020, URL: https://aws.amazon.com/windows/resources/licensemobility/.
Varia, J., "Migrating your Existing Applications to the AWS Cloud," Amazon Web Services, dated Oct. 2010.
Menon, N., "How to Switch From an on-Premise to SAAS Architecture," CognitiveClouds, dated Mar. 18, 2019.
"FlexNet Publisher 2019 R2 (11.16.4) License Administration Guide," Flexera, dated Jul. 2019.
"Informatica Cloud and Product Description Schedule ("CDS and PDS") Version 35," dated Feb. 4, 2022.
"Bringing your own licenses," Google Cloud, date found via Internet Archive as Jun. 17, 2021, URL: https://cloud.google.com/compute/docs/nodes/bringing-your-own-licenses.
"How to Move VMWare Licenses to the Public Cloud," VMWare, Jun. 28, 2018.
Bozinovic, N., "How to Build a True Multi-Cloud Service," dated May 8, 2019.
"Updated Microsoft licensing terms for dedicated hosted cloud services," dated Aug. 1, 2019.
Gagliordi, N., "New VMWare Cloud," dated Mar. 31, 2021.
Poitras, Steven. "The Nutanix Bible" (Sep. 9, 2022), from https://nutanixbible.com/ (Publication date based on indicated capture date by Archive.org; first publication date unknown).
"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.

(56) References Cited

OTHER PUBLICATIONS

"Software Licensing Solutions," Revenera, URL: https://www.revenera.com/software-monetization/products/software-licensing, date found via Google as May 28, 2020.
"Floating license," IBM, URL: https://www.ibm.com/docs/en/developer-for-zos/9.1.1?topic=licenses-floating-license, dated Mar. 3, 2021.
"Enabling floating licenses," IBM, URL: https://www.ibm.com/docs/en/developer-for-zos/9.1.1?topic=licenses-enabling-floating, dated Mar. 3, 2021.
Non-Final Office Action for U.S. Appl. No. 18/054,887 dated Apr. 13, 2023.
Notice of Allowance for U.S. Appl. No. 18/054,887 dated Aug. 21, 2023.
Notice of Allowance for U.S. Appl. No. 18/054,887 dated Sep. 7, 2023.

* cited by examiner

| Column1<br>Virtual Entity | Column2<br>Metering Model | Column3<br>Billing Model |
|---|---|---|
| Virtual Machine | Time * resources, where resources include number of cores | Bill customer at usage * rate, subject to peak pricing premium |
| Virtualized Computing Cluster (on-demand size) | Time * resources, where resources include number of nodes | Bill customer at usage * rate, subject to peak pricing premium |
| Virtualized Computing Cluster (pre-sized) | Time * resources, where resources are limited to a predetermined number of nodes and/or a type of node | Customer has already paid for a predetermined number and type of nodes |
| Virtualized Storage Capacity | Time * storage usage, where usage is an average daily amount of allocated storage | Time * guaranteed capacity * rate, subject to overage premium |

|  | Hybrid Licenses | Pay As You Go | Commit Contracts |
|---|---|---|---|
| Pricing Model | Bring your own term-based licenses | Pay as you go per hour | Term-based minimum monthly commit |
| Term | Cores | Cores/hr, SSD/hr | Cores/hr, SSD/hr |
| Invoice | As per the license agreement | Evergreen | 1 to 5 years |
| Payment | N/A | Monthly | Monthly |
| Commit Model | Upfront | At Metered Rates | Committed $ + Overages |
| Payment Frequency | N/A | N/A | Monthly |
| Payment Mode | Pre-paid all upfront | Post-paid | Pre-paid all upfront, monthly, quarterly, semi-annual, annual |
| Discounts | PO | CC | CC or PO |
| Credit Card on File | By channel | By agreement | Based on UOMs and term commit |
| Procurement | Not required | Required | Required for overages |
| Order | Channel | Online/Credit Card | Online/Backend PO |
|  | Channel | Direct | Direct or Channel |

FIG. 5C

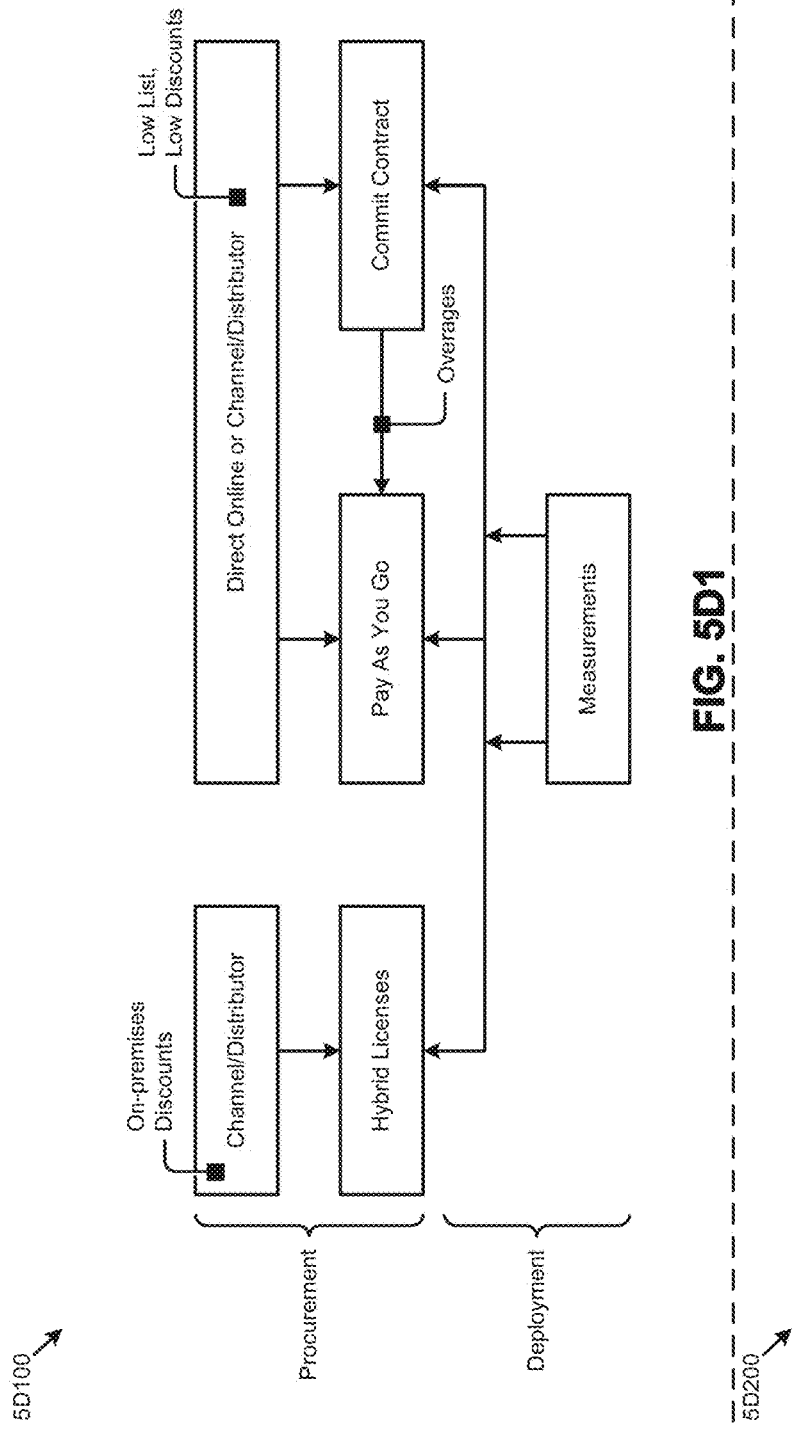
FIG. 5D1
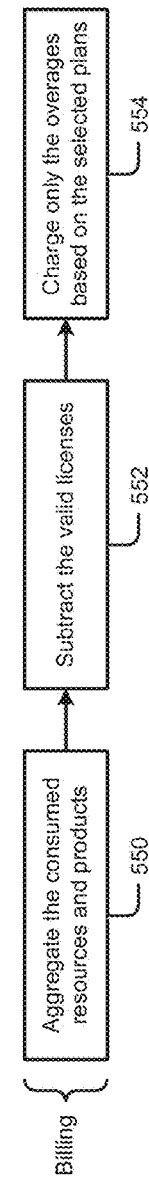
FIG. 5D2

MULTI-CLOUD LICENSED SOFTWARE DEPLOYMENT

RELATED APPLICATIONS

The present application is a continuation of U.S. patent application Ser. No. 18/054,887 titled "MULTI-CLOUD LICENSED SOFTWARE DEPLOYMENT", filed on Nov. 11, 2022 and issued an U.S. Pat. No. 11,886,851, which is a continuation of U.S. patent application Ser. No. 17/334,940 titled "MULTI-CLOUD LICENSED SOFTWARE DEPLOYMENT", filed on May 31, 2021 and issued as U.S. Pat. No. 11,507,356, which claims the benefit of priority to U.S. Provisional Patent Application No. 62/705,920 titled "MULTI-CLOUD LICENSED SOFTWARE DEPLOYMENT", filed on Jul. 22, 2020, which are hereby incorporated by reference in their entirety.

TECHNICAL FIELD

This disclosure relates to cloud computing, and more particularly to techniques for deployment of licensed virtualization system software components into cloud environments.

BACKGROUND

Cloud computing is undergoing rapid adoption. The widespread availability of very accessible and very scalable cloud computing infrastructure has brought cloud computing to a maturity level such that enterprises now rely on highly-available cloud computing infrastructures to handle fluctuations in the enterprise's computing demand. For example, an enterprise might have a day-to day workload for which day-to-day demands can be met by the enterprise's on-premises hardware/software; however, during periods of peak demand (e.g., at the end of a quarter when activity is especially high), then the demand overage can be satisfied by merely moving some of the computing load to the cloud infrastructure. In many situations, such flexibility is facilitated by virtualization software that provides a layer of abstraction between the cloud infrastructure (e.g., computing processors, networking hardware, storage subsystems, etc.) and whatever software (e.g., applications, services, etc.) the enterprise needs to run. When using such virtualization software, any particular software (e.g., applications, services, etc.) that the enterprise needs to run can be quickly brought up to run on any particular cloud infrastructure merely by configuring the virtualization software to comport with the configuration of a particular cloud vendor's infrastructure.

In some situations, the task of configuring the virtualization software to comport with the configuration of a particular cloud vendor's infrastructure has been at least partially automated. In fact, virtualization software vendors compete to offer the latest and easiest and most complete (i.e., most automated) virtualization systems. Almost daily, new "Pay-As-You-Go" features of virtualization systems are offered. Many of these features are offered with product-specific, metered licensing terms and conditions.

Unfortunately, there are no mechanisms in place to support arbitrage and usage monitoring of metered software in such multi-cloud deployments. What is needed is a way to measure the extent to which what software features are being used, and for how long, and on what infrastructure, etc. Therefore, what is needed is a technique or techniques that address amalgamating resource usage measurements taken from multiple computing clouds.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for licensed virtualization system component deployment, which techniques advance the relevant technologies to address technological issues with legacy approaches. More specifically, the present disclosure describes techniques used in systems, methods, and in computer program products for processing resource usage from a plurality of different clouds in a hybrid cloud setting (e.g., involving private computing clouds and public computing clouds). Certain embodiments are directed to technological solutions for taking and combining licensed floating component usage measurements as time-metered software is executing across two distinct computing clouds.

The disclosed embodiments modify and improve over legacy approaches. In particular, the herein-disclosed techniques provide technical solutions that address the technical problems attendant to instantiating virtualized entities on or across selected ones of multiple computing clouds. More specifically, at least the aspect of matching characteristics of a computing workload to capabilities of a particular matched-to computing cloud, instantiating virtualized entities onto the particular matched-to computing cloud, and then executing the workload particular matched-to computing cloud serves to improve computer functionality. This is because the matched-to computing cloud is better suited to the computing demands of the workload. The mechanism of floating licenses, and the flexibility afforded therefrom avoids non-optimal deployment of workloads, which would otherwise happen but for the technical solutions for licensing and provisioning as disclosed herein. More specifically, in absence of matching characteristics of a computing workload to capabilities of a particular computing cloud infrastructure, it is possible that the workload becomes instantiated on computing infrastructure that is already overloaded and/or becomes instantiated on computing infrastructure that has hardware that is inaptly configured for the particular type of workload.

The technical solutions disclosed herein involve specific implementations (i.e., data organization, data communication paths, module-to-module interrelationships, etc.) that relate to the software arts for improving computer functionality. Specifically, application of the herein-disclosed improvements in computer functionality serve to reduce demands for computer memory, reduce demands for computer processing power, reduce network bandwidth usage, and reduce demands for intercomponent communication.

The herein-disclosed embodiments involve technological solutions pertaining to technological problems that arise in the hardware and software arts that underlie virtualized computing systems. Aspects of the present disclosure achieve performance and other improvements in peripheral technical fields including, but not limited to, hyperconverged computing platform management and cloud-based cluster management.

Some embodiments include a sequence of instructions that are stored on a non-transitory computer readable medium. Such a sequence of instructions, when stored in memory and executed by one or more processors cause the one or more processors to perform a set of acts for taking and combining resource usage measurements as time-metered software is executing across two distinct computing clouds.

Some embodiments include the aforementioned sequence of instructions that are stored in a memory, which memory is interfaced to one or more processors such that the one or more processors can execute the sequence of instructions to cause the one or more processors to implement acts for taking and combining licensed floating component usage measurements.

In various embodiments, any combinations of any of the above can be combined to perform any variations of acts for deploying licensed virtualization system component deployment into a plurality of different clouds (e.g., in a hybrid cloud setting), and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 1D is a billing model matrix that presents examples of billing models covering virtualized entities that are formed of various licensed metered usage virtualization system software components, according to an embodiment.

FIG. 5C presents an example set of consumption models that are used in systems that measure consumption of floating licenses for virtualization system software components, according to an embodiment.

FIG. 5D1 and FIG. 5D2 present an example set of procurement and billing workflows that are used in systems that measure consumption of floating licenses for virtualization system software components, according to some embodiments.

DETAILED DESCRIPTION

Figure 1A:
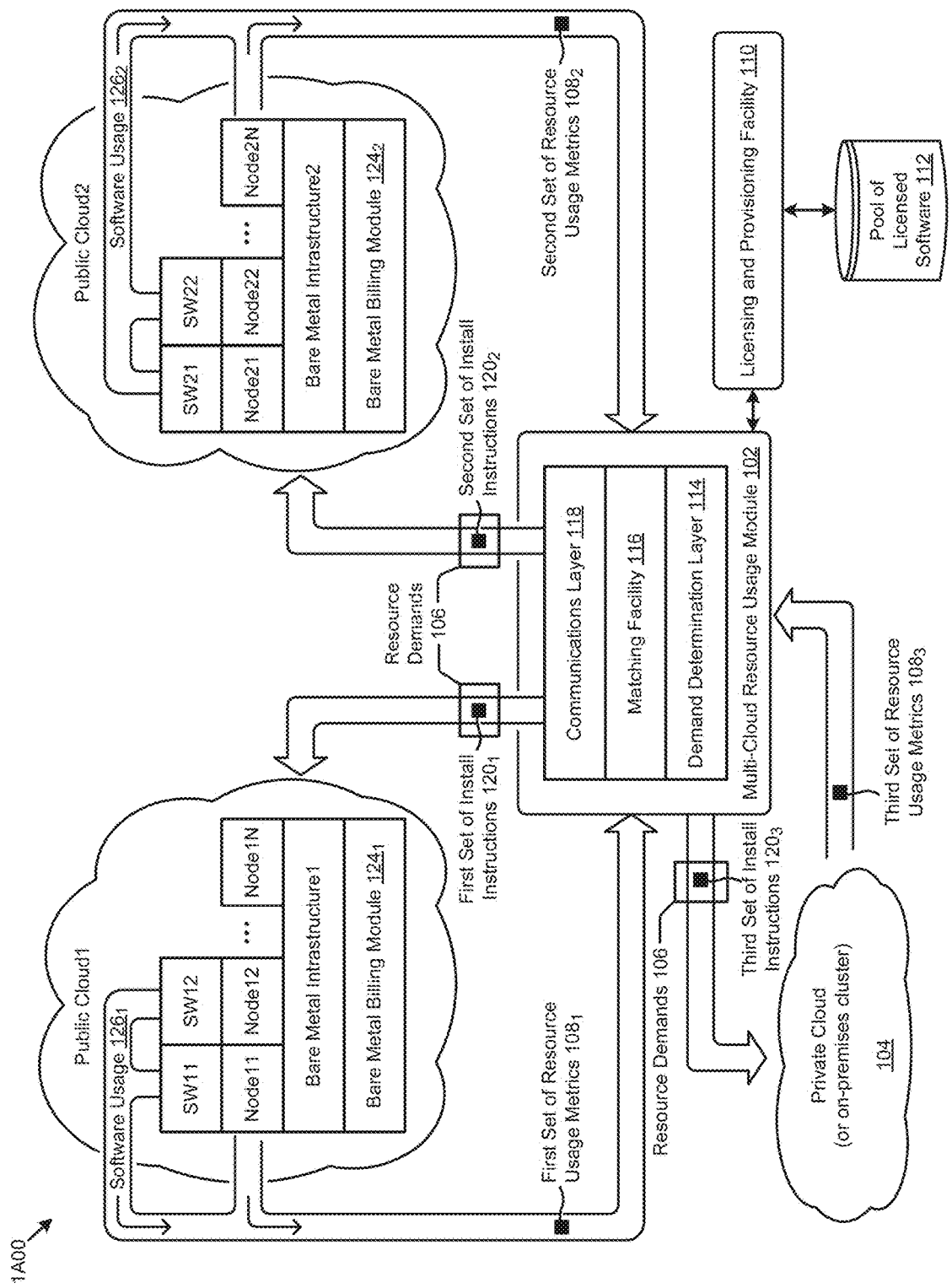
FIG. 1A exemplifies a system for deploying licensed software to a plurality of different clouds, according to an embodiment.

Aspects of the present disclosure solve problems associated with using computer systems for amalgamating resource usage measurements taken from multiple computing clouds. These problems are unique to, and may have been created by, various computer-implemented methods for amalgamating resource usage measurements taken from multiple computing clouds in the context of virtualized computing systems. Some embodiments are directed to approaches for taking and combining resource usage measurements as time-metered software is executing across two distinct computing clouds. The accompanying figures and discussions herein present example environments, systems, methods, and computer program products for licensed virtualization system component deployment to a plurality of different clouds in a hybrid cloud setting.

Overview

Virtualization of clusters enables customers to run virtualization software in public clouds, thus taking advantage of the availability and pricing of bare metal instances that are provided by the public clouds. From a billing perspective, the virtualization system software usage is decoupled from the cloud infrastructure usage such that customers receive two bills/invoices: (1) one bill to the customer is from the cloud provider for cloud infrastructure usage, used in the cloud, where the customer is responsible to pay the cloud provider directly in accordance with the customer's existing commercial arrangements with the cloud vendor; and (2) another bill to the customer is from the vendor of the virtualization system software.

Capacity-based licenses (CBLs) allow for customers to use specific virtualization system software components in accordance with purchased on-premises licenses, whereas subscriptions allow for customers to use a wider range of specific virtualization system software components so long as the commercial terms of the subscription are met. Subscriptions are offered in accordance with popular subscription and usage models. For example, a "Pay-As-You-Go" subscription model allows for customers to consume virtualization software products at an hourly billing rate. As another example, a "Commit Contract" allows for customers to enjoy discounts when committing to a term-based (e.g., monthly) minimum dollar amount. Under this model, any consumption above the committed amount is charged as an overage, possibly at a "Pay-As-You-Go" billing rate. Under the use-it-or-lose-it terms of a "Commit Contract", a customer is charged periodically for the entire committed amount even if the usage is below the commit amount.

Licensed Virtualized Entities from Licensed Virtualization System Software Components A selected license model, or a combination of license models, can be applied to a virtualized entity. Specifically, a license model (or combination of license models) can be applied at a cluster level or at a node level. That is, a cluster or a node is formed of a specific set and configuration of virtualization system software components that run on bare metal. A virtualized entity is considered to be a licensed virtualized entity when the constituent components needed to form and/or configure and/or execute the virtualized entity are licensed components. In some cases a configurator of a portion of a virtualized entity is licensed, and as such the virtualized entity itself is deemed to be licensed.

Once the virtualized entity (e.g., node or cluster) is configured and/or running, ongoing usage of resources by the specific set of virtualization system software components is metered. Each different configuration and/or instance of any particular virtualization system software components can have a corresponding billing rate. At some billing interval, the usage is amalgamated and the license model is applied. In some cases, the need for additional virtualization system software components (e.g., to form a cluster of a specified size), can exceed the number of licenses already purchased by the customer. As such, the billing rate for the needed additional virtualization system software components can be applied for the overage portion that exceeds the number of licenses already purchased by the customer. Overage portions might be tallied against a commit contract (if any) and/or overage portions might be tallied against a "Pay-As-You-Go" subscription. More generally, on a periodic basis, a computer-implemented billing service collects the actual metered usage during the period, adjusts the actual metered usage (e.g., subtracts) to account for licenses that the customer has already paid for, and charges the customer on the remaining usage (e.g., based on applicable subscription plans and/or commercial arrangements).

Billing Technology Implementation

During onboarding of a new customer, the customer selects one or more subscription plans and specifies a payment method (e.g., purchase order, credit card, etc.). A customer can select alternative one or more subscription plans at any point in time.

When the customer wishes to deploy a virtualized entity (e.g., a cluster of nodes, or even a single node), the customer specifies characteristics (e.g., number of nodes, amount of storage, etc.) of the virtualized entity to be deployed. Many additional aspects of a virtualized entity can be specified by a customer. For example, a customer can specify particular versions and/or configurations of virtualization system software components. The specified virtualized entity is configured using the virtualization system software components and deployed together with a virtualization system software metering capability. Execution of workload is then initiated on the virtualized entity.

During runtime, the virtualization system software usage is metered. Strictly as examples, metering might include (1) time of running on specific cores or core types, (2) amount of solid state storage device (SSD) storage, (3) a number of nodes active in a cluster, and (4) other metering such as may apply to a per product/per hour billing model. Measured usage is reported on an ongoing basis to a billing amalgamator module.

At any point in time, the user can allocate or remove or update licenses for various products and/or, at any point in time. Moreover, the user can select different licensing models and/or add additional subscriptions at any point in time. Such changes are periodically reported to the billing amalgamator module.

Floating Licenses

Any of the foregoing licensing models can be applied to any cluster or node on any infrastructure. For example, a first cluster might be formed of a first set of virtualization system software and situated on on-premises infrastructure, while a second cluster formed of second set of virtualization system software and situated on bare metal infrastructure of a public cloud provider, while a third cluster is formed of a third set of virtualization system software and situated on bare metal infrastructure of another public cloud provider. So long as the customer has a covering commercial arrangement (e.g., paid-up licenses, subscription-based licenses, commit contract licenses) that covers licensed virtualization system software, then the covered licenses can float to any infrastructure. As such, the foregoing metering and amalgamation of usage allows any combination of licensing models and any combination of floating licenses to be honored irrespective of where the virtualized entity is running.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1A exemplifies a system 1A00 for deploying licensed software to a plurality of different clouds in a hybrid cloud setting (e.g., involving private computing clouds and public computing clouds). As an option, one or more variations of system or any aspect thereof may be implemented in the context of the architecture and functionality of the embodiments described herein. The system or any aspect thereof may be implemented in any environment.

More particularly, two different public cloud environments (e.g., the shown public cloud1 and public cloud2) comprise heterogeneous infrastructure. For example, the infrastructure of a first cloud environment might be substantially based on hardware from a first vendor, whereas the infrastructure of a second cloud environment might be substantially based on hardware from a second, different vendor. Moreover, in some cases, software or firmware hosted the infrastructure of a first cloud environment might be substantially based on software or firmware from a first vendor, whereas the software or firmware hosted on the infrastructure of a second cloud environment might be substantially based on software or firmware from a second, different vendor.

A multi-cloud resource usage module 102 is deployed to provide Internet communications to/by/and between any of (a) two distinct public clouds (e.g., public cloud1 and public cloud2), and (b) a private cloud or on-premises cluster 104. The multi-cloud resource usage module 102 is configured to operate in a hybrid cloud setting, and is further configured to send a first set of resource demands 106 to a first cloud, a second set of resource demands to a second cloud, and a third set of resource demands to a private cloud or on-premises cluster 104. The multi-cloud resource usage module 102 is configured to receive resource usage metrics (e.g., first set of resource usage metrics $108_1$, second set of resource usage metrics $108_2$, third set of resource usage metrics $108_3$).

The particular set of demands to be sent to a particular cloud can be determined by a deployment system (e.g., the shown licensing and provisioning facility 110). Thus, in combination, and in this particular implementation, the system of FIG. 1A is able to (1) analyze a computing workload and then to deploy a first portion of the computing workload onto a first computing infrastructure of a first computing cloud, and (2) further analyze the computing workload for deploying a second portion of the computing workload onto a second computing infrastructure of a second computing cloud. The deployed software, possibly in conjunction with additional instrumentation software, runs on the two clouds. The deployed software, possibly in conjunction with additional instrumentation software, continually takes resource usage measurements (e.g., licensed software usage measurements) as the software is executing on the two distinct computing clouds.

As shown, the licensing and provisioning facility draws from a pool of licensed software 112. The particular software that is selected for execution across the two distinct computing clouds. Moreover a particular first set of licensed software is selected for execution in a first cloud, while a of particular second set software is selected for execution in a second cloud, and so on.

The multi-cloud resource usage module 102 is in communication with licensing and provisioning facility 110. The two modules interoperate to analyze demands from a computing workload (e.g., via a demand determination layer 114), perform matching operations between the determined demands and capabilities of a particular cloud (e.g., via a matching facility 116) and then to deploy (e.g., using communications layer 118) different sets of install instructions (e.g., the shown first set of install instructions 1201, second set of install instructions 1202, third set of install instructions 1203) to the different clouds.

The install instructions may include allocation of nodes on each cloud (e.g., node11, node12, node1N, node21, node22, and node2N), which nodes may be provided as bare metal nodes—possibly organized together with non-node components of a particular set of bare metal infrastructure (bare metal infrastructure1 and bare metal infrastructure2). Each different cloud may have its own billing mechanism (e.g., via bare metal billing module 1241, bare metal billing module 1242, etc.). Additionally, and as depicted, software usage (e.g., software usage 1261 and software usage 1262) may be measured as the software (e.g., software SW11, software SW12, software SW21, software SW22) is being used.

A tenant or account holder of a particular cloud may be billed for bare metal resource usage by the provider of respective cloud infrastructure, while the same tenant or account holder may be billed separately by the provider of the licensed software.

As used herein, the phrase 'two distinct computing clouds' refers to two different sets of computing infrastructure, where at least one set of computing structure is held out for use by members of the public to deploy workloads as deemed by respective members of the public. The two different sets of computing infrastructure can be different from each other in that one set of computing infrastructure is held out to comport to a first configuration, whereas the other set of computing infrastructure is held out to comport to a second configuration. The different infrastructure may be owned by different entities, or the different infrastructure may be owned by the same entity. Members of the public may establish accounts with the owners of the infrastructure, and in some cases a particular member of the public may sign up for multiple accounts with the same cloud owner.

The system of FIG. 1A is able to support multiple accounts. One example configuration of a licensing and provisioning facility module that supports multiple accounts in conjunction with a multi-cloud resource usage module that supports multiple accounts is shown and described as pertains to FIG. 1B.

Figure 1B:
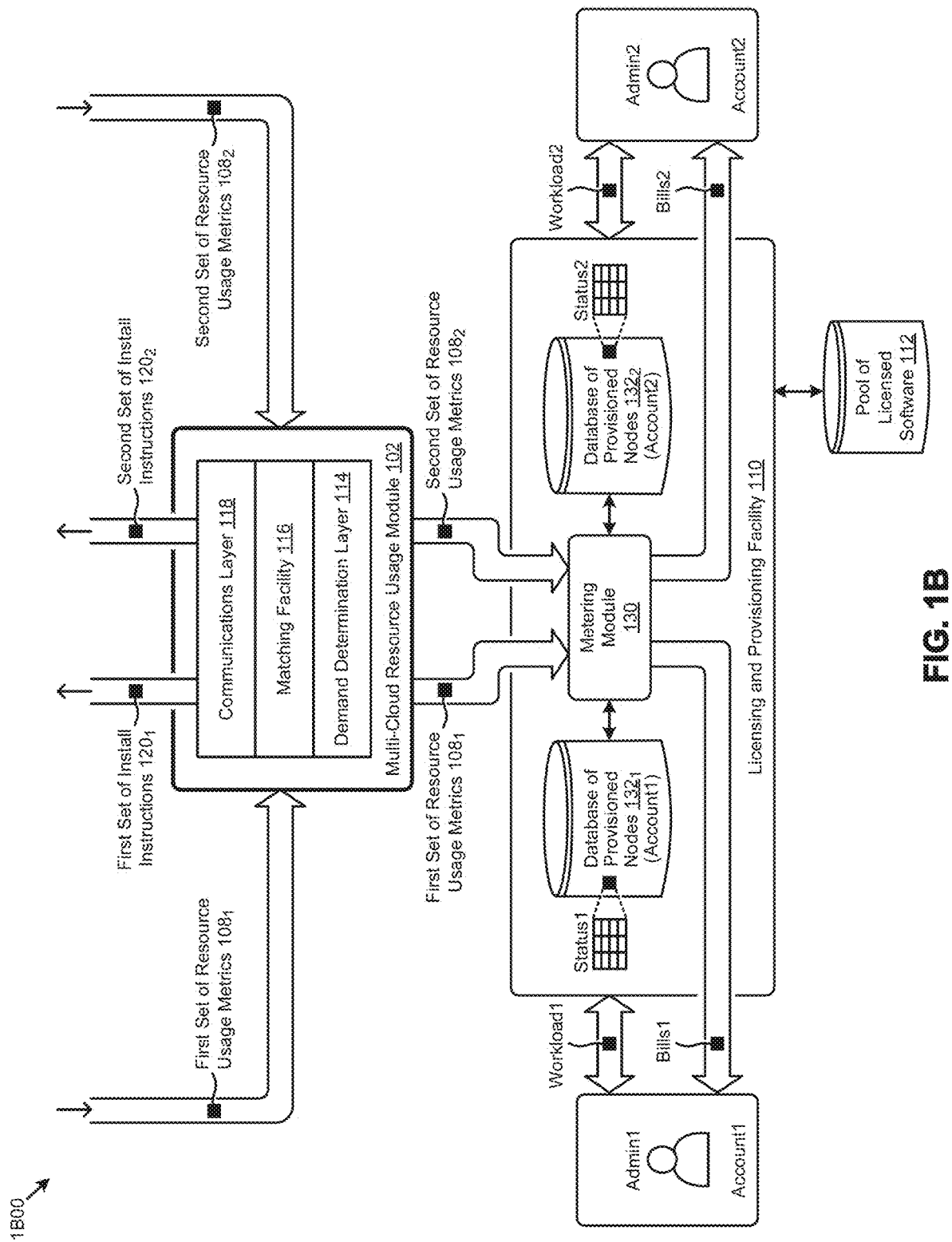
FIG. 1B shows a licensing and provisioning facility as used in systems that process resource usage measurements from two different cloud providers, according to an embodiment.

FIG. 1B shows a licensing and provisioning facility as used in system 1B00 that processes resource usage measurements from two different cloud providers. As shown, the licensing and provisioning facility 110 is configured to keep track of different accounts (e.g., account1 and account2), different workloads (e.g., workload1, workload2), different bills (e.g., bills1, bills2), and different sets of provisioned nodes. As such, any number of accounts, each with their own particular workloads, can be managed by the licensing and provisioning facility. In this particular embodiment, the licensing and provisioning facility includes separate databases for respective accounts such that the status of any provisioned nodes can be maintained. Moreover, the licensing and provisioning facility includes a metering module 130 that is able to identify time-metered software that might be employed by any workflow.

The metering module can deploy time-metered software to the two distinct clouds, possibly with additional software for taking and reporting execution-time usage measurements. Further, the metering module can receive resource usage metrics (e.g., first set of resource usage metrics $108_1$, second set of resource usage metrics $108_2$) from each of the two distinct clouds, which resource usage metrics may include per-workload usage of the time-metered software. Any resource usage metric may be conveyed from a particular cloud, through a multi-cloud resource usage module 102, and onward to a licensing and provisioning facility 110. In this and other embodiments, any resource usage metric may be conveyed via messaging (e.g., over a TCP/IP network), and furthermore, any resource usage metric may be associated with some particular infrastructure component. As examples, and as shown, a first set of resource usage metrics $108_1$, may be associated with a bare metal node of cloud1, whereas a second set of resource usage metrics $108_2$ maybe associated with a bare metal node of cloud2. Ongoing status of various provisioned nodes from cloud1 and cloud2 can be maintained in cloud-specific databases (e.g., database of provisioned nodes $132_1$, database of provisioned nodes $132_2$), which in turn can maintain real-time status records (e.g., status1, status2).

Any known technique can be used to establish and query the aforementioned databases. In one embodiment, the database of provisioned nodes include details of hardware components of the nodes (e.g., CPUs, type of CPUs, on-board memory, type of memory, on-board persistent storage, type of persistent storage, etc.). As such, it is possible for the metering module to perform hardware-specific usage calculations. For example, consider the scenario where a licensed software title corresponds to a metered usage billing entity. Further consider that the licensed software might have been in use for one hour on a higher-performance node or CPU, or alternatively, that the licensed software might have been in use for one hour on a lower-performance node or CPU. By knowing the software title, the time that the software title was in use on a particular node or CPU, characteristics (e.g., higher-performance or lower-performance) of the particular node or CPU, and billing rates that correspond to the particular node or CPU, a billing amount can be calculated. In the embodiment of FIG. 1B, the billing amounts are calculated by the metering module, and bills (e.g., bills1 and bills2) are sent to administrators (e.g., admin1, admin2) of the respective accounts.

In accordance with the shown system for deploying licensed software to multiple clouds, the resource usage metrics from different clouds and the licensing and provisioning facility can be used for, and/or in, any of multiple environments. For example, although the example embodiment of FIG. 1A and FIG. 1B includes two distinct public clouds, there could be a third cloud, and/or a fourth cloud, etc. Moreover, any portion of the workloads can be apportioned between any of (1) computing clusters on public clouds, (2) computing clusters on private clouds, and (3) on-premises computing clusters.

The embodiments of FIG. 1A and FIG. 1B are merely examples where usage of licensed software is measured based on execution in cloud-provided environments. However, there are many scenarios where hypervisors, virtual machine controllers, and other virtualization system software components are deployed to the cloud to form the execution environment itself (e.g., a virtualization system). In such scenarios, low-level components such as hypervisors, virtual machine controllers, and other virtualization system software components are provided to the cloud provider for execution on bare metal nodes. In some such scenarios, usage of such low-level components may be metered in the cloud, and forwarded to the provider of the virtualization system software components. One such example is shown and described as pertains to FIG. 1C.

Figure 1C:
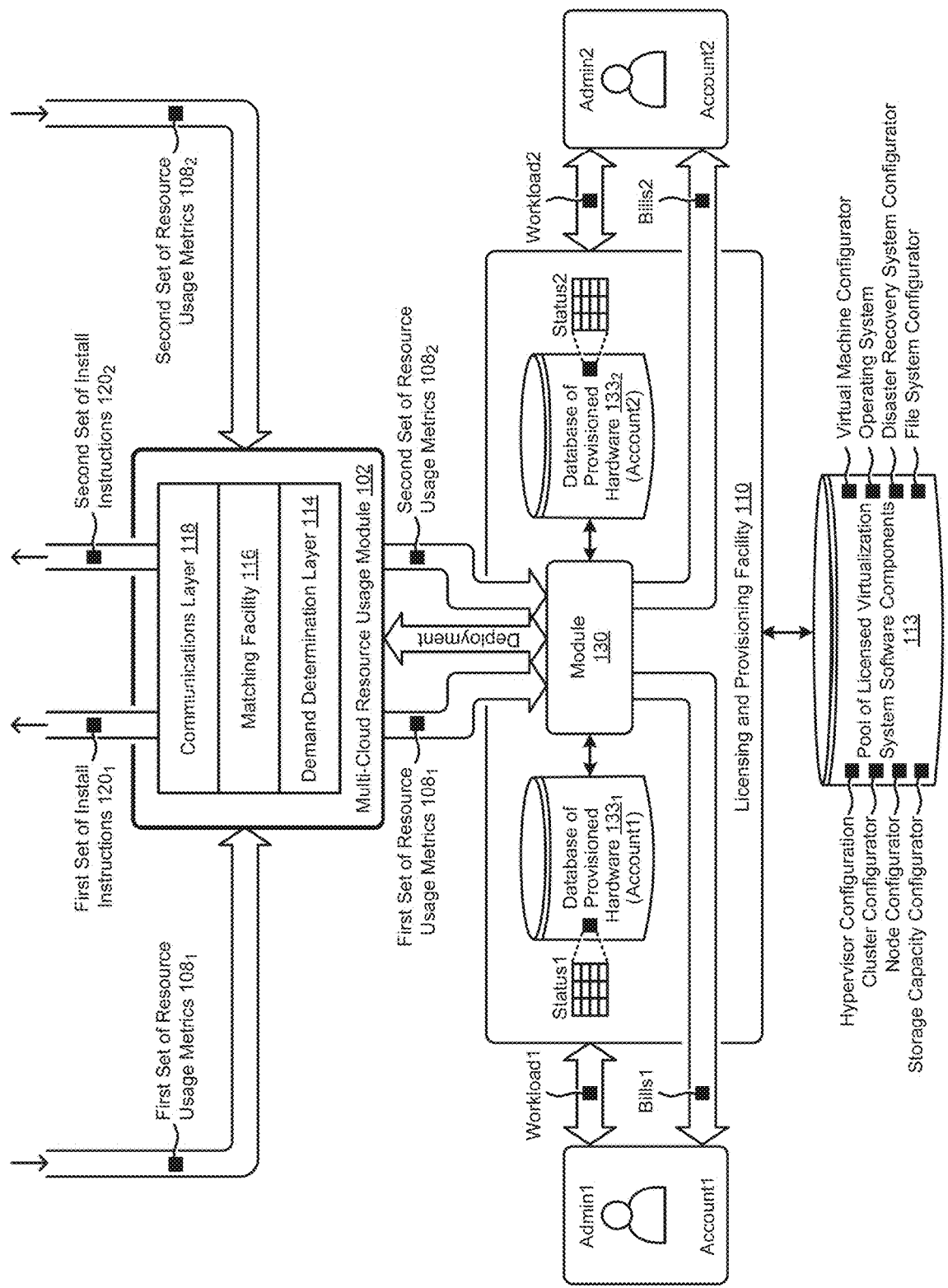
FIG. 1C shows an example of how a pool of licensed metered usage virtualization system software components are used to form virtualized entities, according to an embodiment.

FIG. 1C shows an example of how a pool of licensed metered usage virtualization system software components are used to form virtualized entities. As an option, one or more variations of the shown example or any aspect thereof may be implemented in the context of the architecture and functionality of the embodiments described herein. The pool of licensed metered usage virtualization system software components or any aspect thereof may be implemented in any environment.

The figure is being presented to illustrate that a pool of licensed software, such as shown and described as pertains to FIG. 1A and FIG. 1B, might be populated with floating licenses for various virtualization system software components (e.g., licensed metered usage virtualization system software components). Moreover, the figure is being presented to illustrate how a licensing and provisioning facility can maintain, in real-time, databases of hardware that had been provisioned to host the foregoing licensed metered usage virtualization system software components. Such databases of hardware are shown in FIG. 1C as provisioned hardware databases $133_1$ and provisioned hardware databases $133_2$. The hardware databases are maintained in real-time to include relationships between any particular deployed licensed metered usage virtualization system software component and a hardware component on which the particular deployed licensed metered usage virtualization system software component is hosted.

The pool of licensed metered usage virtualization system software components 113, such as shown in FIG. 1C, may comprise any of a wide variety of virtualization system components. Strictly as examples, and as depicted in FIG. 1C, the metered usage virtualization system software components might include a hypervisor of a particular configuration, a cluster configurator, a node configurator, a storage capacity configurator, a virtual machine code template, an operating system, a disaster recovery system configurator, a file system configurator, etc. The foregoing virtualization system components, including any of the foregoing configurator components may be licensed. In some cases a licensed configurator embeds or otherwise associates a license to the configured virtualization entity. For example, a virtual machine configurator may be licensed, and when the virtual machine configurator is used to form a virtual machine, a license to run such a virtual machine on a particular core or set of cores is associated with that formed virtual machine. In some cases, a configurator will impart metering software into its configured virtualized entity, and/or deploy metering software around the configured virtualized entity.

As such, one can see that rather than merely determining the existence of, and/or deployment and execution of, a software application (e.g., Adobe Acrobat) such as would comport with enforcement and/or billing in a perpetual license or time-bound subscription model, there are certain software components (e.g., metered usage virtualization system software components) that can be assembled together to form higher-level virtualized entities (e.g., virtual machines, virtualized computing clusters, etc.) such that any/all of the lower-level components can be subjected to capacity-based metering as the higher-level virtualized entities execute on the bare metal nodes. The higher-level virtualized entity might be itself subjected to capacity-based licensing/metering. In some cases, a higher-level virtualized entity might be itself be subjected to capacity-based licensing/metering that is in turn based on a size parameter. For example, a cluster configurator might be licensed to build a cluster or clusters comprising a total of M nodes. If a request is made to configure a cluster or clusters comprising a more than M nodes, the request might be denied, or, in the case that the licensee has commercial arrangements under a commit contract or under a Pay-As-You-Go contract, then the request might be satisfied, with the overage being billed out in accordance with the terms and condition of the foregoing commercial arrangements.

Additionally, or alternatively, the metered usage virtualization system software components as heretofore shown and discussed might be self-monitoring for usage. In some cases, virtualization system software components might be paired with a measurement facility that is configured to detect the time period during which a particular virtualization system component is deployed on a particular instance of hardware. As one specific case, virtualization system software components might be paired with a measurement facility that is configured to detect the time period during which a particular virtualization system component is actually executing on a particular instance of hardware. In some deployments, individual components of a virtualization system are individually licensed, while a particular virtualization entity that is formed from the individual components of the virtualization system is the entity that is to be instrumented for resource usage.

Strictly as an example of how individual components of the virtualization system can be configured to form an executable virtual machine or executable container can be formed from the individual components of the virtualization system, such as from a hypervisor and associated virtualization system components and/or such as from a Docker container shell and associated virtualization system components. As another example, an executable virtualization entity (e.g., a computing cluster) can be formed from the individual components of the virtualization system (e.g., from an interconnected set of virtual machines and a virtual storage capability).

In this and alternative embodiments, module 130, in addition to performing metering (as shown) the module is able to manage instantiation of individual components of the virtualization system (e.g., to configure individual components, to prepare individual components for deployment, to deploy individual components, etc.) and/or to manage ongoing usage of components of the virtualization system in accordance with availability and configuration of floating licenses that are in the pool of licensed metered usage virtualization system software components 113.

As used herein, in this and other embodiments, a floating license is a logical designation that a particular component can be used on any infrastructure. Many floating licenses to many different components can be stored in a logical pool. A floating license can be checked out from a pool (e.g., becomes in use) when a corresponding particular component is deployed onto infrastructure. A floating license can remain in use while its corresponding component is moved from one infrastructure to another infrastructure. Moreover, a floating license can remain in use while being moved from one infrastructure to another infrastructure even without returning the floating license to the pool. A floating license may correspond to an individual component of a virtualization system and/or a floating license may correspond to an individual higher-level virtualized entity.

Any of the foregoing floating licenses, and/or any component of a virtualization system and/or any higher-level virtualized entity can be associated with respective usage and billings models. Examples of such usage and billings are shown and described as pertains to FIG. 1D.

FIG. 1D is a billing model matrix 1D00 that presents examples of billing models covering virtualized entities that are formed of various licensed metered usage virtualization system software components.

The billing model matrix includes a first column (column1) that lists time-metered software components, a second column (column2) that describes a metering model that corresponds to the time-metered software components in the same row, and a third column (column3) that describes a billing model that corresponds to the time-metered software components in the same row. In some cases, a metering model relates a usage time duration to the resource or resources used by the time-metered software component. For example, licensed software that is run to create and monitor a virtual machine might be metered on the basis of how long the created virtual machine was used on a particular CPU, and the corresponding billing model might calculate a dollar amount based on that usage model multiplied by a dollar rate. As another example, licensed software that is run to create and monitor a virtualized computer cluster might have a corresponding metering model that measures the time duration that the virtualized computer cluster was loaded onto bare metal nodes that constitute the hardware of the cluster. As another example, licensed software that is run to create and monitor a virtualized storage capacity might measure the time duration that a particular requested and guaranteed storage capacity was available. As another example, licensed software that is run to create and monitor a virtualized storage capacity might measure the time duration that a particular amount of storage capacity was allocated.

Of course the foregoing are merely examples. Other metering models and other billing models are contemplated, and the particular set of time-metered virtualized entities as shown in column1 of billing model matrix 1D00 are merely an illustrative subset of the full set of possible time-metered virtualized entities. Moreover, it might happen that a first set of time-metered virtualized entities are deployed to hardware of a first cloud and a second set of time-metered virtualized entities are deployed to hardware of a second cloud. As such, the mechanisms involved in reporting metered usage may vary by cloud provider. Any such differences can be normalized prior to sending out bills.

Figure 1E:
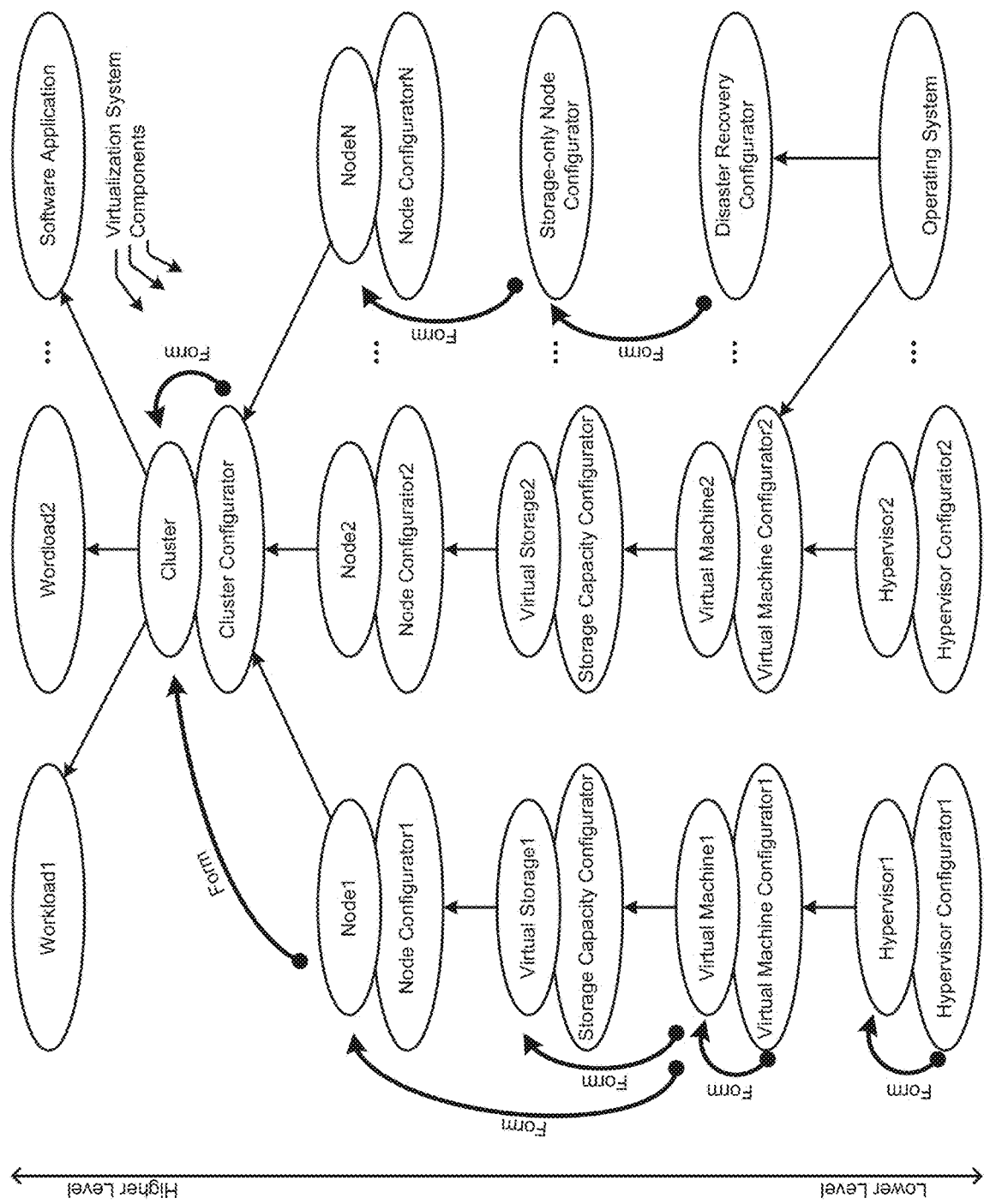
FIG. 1E depicts how lower level virtualization system components can be used to form higher level virtualization system components, according to an embodiment.

FIG. 1E depicts how lower level virtualization system components can be used to form higher level virtualization system components. The figure shows a variety of virtualization system components at different levels. Specifically, the figure shows how a higher level virtualization system entity embodied as a cluster can be formed of other virtualization system entities such as nodes (e.g., node1, node2, nodeN). The figure also shows how a higher level virtualization system entity embodied as a node can be formed of lower level virtualization system entities such as an operating system, a hypervisor, a virtual machine, etc.

A virtualization system entity can be constituted and configured through use of a configurator. In some embodiments, virtualization system software comprises a licensed configurator. That is, a configurator for an entity being constituted and configured might itself be licensed, and the configurator and its license might float to any computing infrastructure. In some cases, the lifespan of a configurator for an entity might be merely for the duration that the configurator executes to form the entity. In some cases, a floating license to a configurator imparts a floating license to the entity it configures, and as such, the entity configured by the configurator is associated to a floating license for the particular lower level, or mid-level, or higher level entity. Moreover, in some cases, a floating license to a configurator imparts a floating license to run the virtualization system entity it configures on a particular instance of cloud computing infrastructure. Still further, in some cases, a floating license to a configurator imparts a floating license to measure execution time resource usage by the entity it had configured to run on a particular instance of cloud computing infrastructure. As shown, configurators can apply to lower level virtualization system components such as hypervisors, as well as to mid-level or higher level virtualization system components such as virtual machines, nodes, and clusters.

Even still further, the floating licenses may be specific to a particular configuration. For example, floating licenses may apply not only to a node, but also to any of the node's constituent components. In some cases, one or more of a node's constituent components has specific entitlements to enable certain features, and/or entitlements to operate on specific hardware components (e.g., specific CPU core types, specific special-purpose processors, etc.).

Example embodiments involving forming higher level virtualization system components from lower level virtualization system components and deploying workloads across two different public clouds are shown and described as pertains to FIG. 2A, FIG. 2B, FIG. 2C, and FIG. 2D.

Figure 2A:
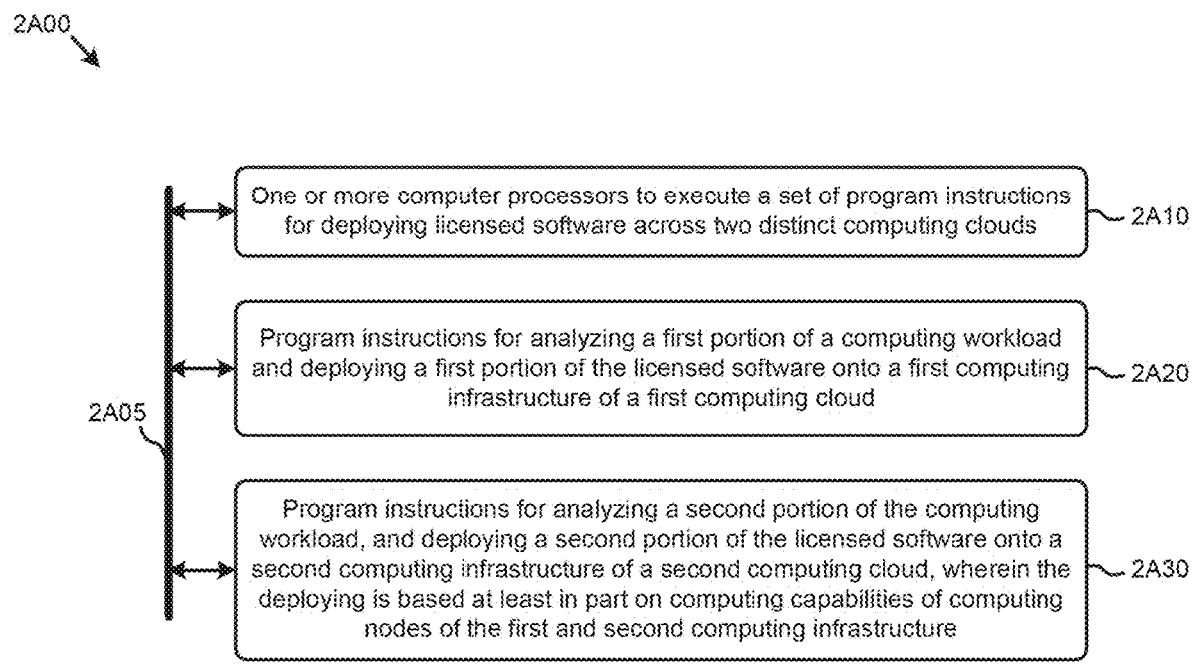
FIG. 2A presents a system that is used to process computing workloads that are deployed across different cloud providers, according to an embodiment.

FIG. 2A presents a system that is used to process computing workloads that are deployed across different cloud providers. As an option, one or more variations of system 2A00 or any aspect thereof may be implemented in the context of the architecture and functionality of the embodiments described herein. The system 2A00 or any aspect thereof may be implemented in any environment.

More specifically, FIG. 2A depicts system 2A00 as an arrangement of computing modules that are interconnected so as to operate cooperatively to implement certain of the herein-disclosed embodiments. The partitioning of 2A00 is merely illustrative and other partitions are possible. Variations of the foregoing may include more or fewer of the shown modules. Certain variations may perform more or fewer (or different) steps and/or certain variations may use data elements in more, or in fewer, or in different operations.

As shown, FIG. 2A depicts a block diagram of a system to perform certain functions of a computer system. As an option, the system 2A00 may be implemented in the context of the architecture and functionality of the embodiments described herein. Of course, however, the system 2A00 or any operation therein may be carried out in any desired environment.

The system 2A00 comprises at least one processor and at least one memory, the memory serving to store program instructions corresponding to the operations of the system. As shown, an operation can be implemented in whole or in part using program instructions accessible by a module. The modules are connected to a communication path 2A05, and any operation can communicate with any other operations over communication path 2A05. The modules of the system can, individually or in combination, perform method operations within system 2A00. Any operations performed within system 2A00 may be performed in any order unless as may be specified in the claims.

The shown embodiment implements a portion of a computer system, presented as system 2A00, comprising one or more computer processors to execute a set of program code instructions for deploying licensed software across two distinct computing clouds (module 2A10) and modules for accessing memory to hold program code instructions to perform: analyzing a first portion of a computing workload and deploying a first portion of the licensed software onto a first computing infrastructure of a first computing cloud (module 2A20); and analyzing a second portion of the computing workload, and deploying a second portion of the licensed software onto a second computing infrastructure of a second computing cloud, wherein the deploying is based at least in part on computing capabilities of computing nodes of the first and second computing infrastructure (module 2A30).

Figure 2B:
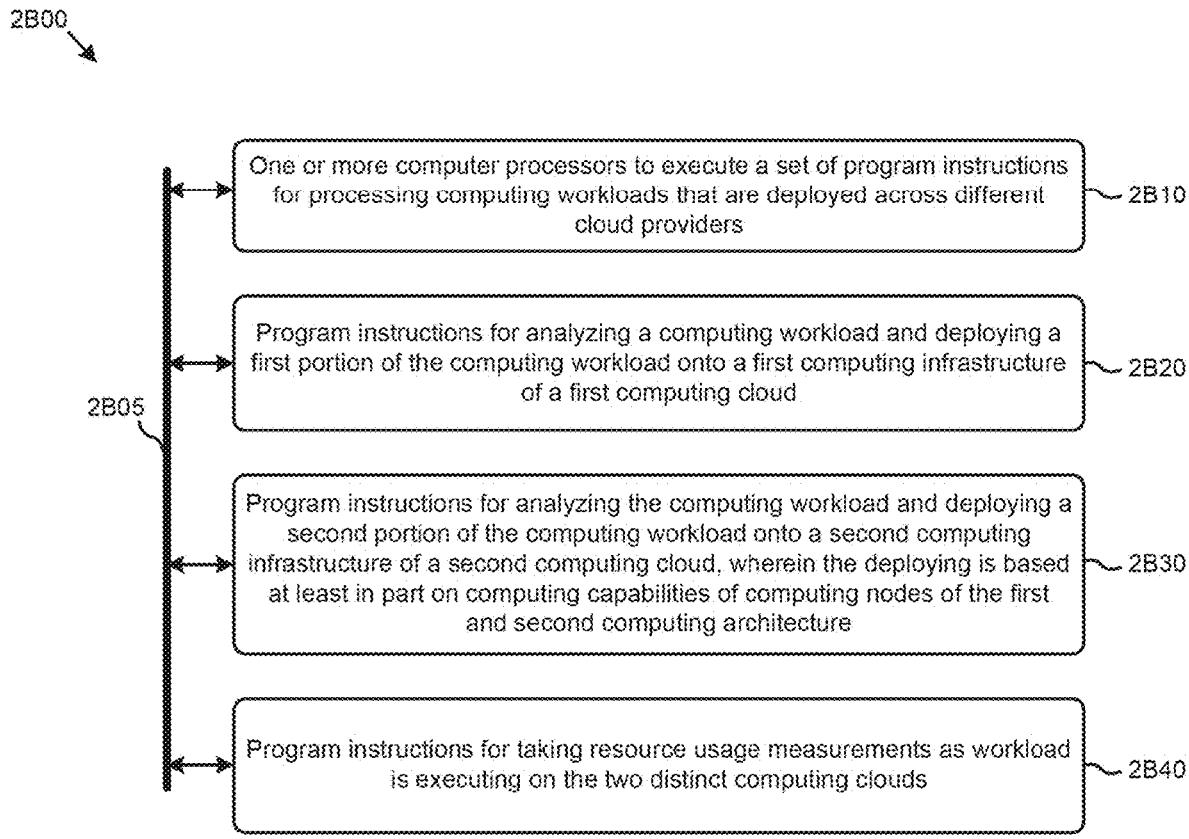
FIG. 2B presents a system that is used to process computing workloads that are deployed across different cloud providers, according to an embodiment.

FIG. 2B presents a system that is used to process computing workloads that are deployed across different cloud providers. As an option, one or more variations of system 2B00 or any aspect thereof may be implemented in the context of the architecture and functionality of the embodiments described herein. The system 2B00 or any aspect thereof may be implemented in any environment.

More specifically, FIG. 2B depicts a block diagram of a system to perform certain functions of a computer system. As an option, the system 2B00 may be implemented in the context of the architecture and functionality of the embodiments described herein. Of course, however, the system 2B00 or any operation therein may be carried out in any desired environment.

The system 2B00 comprises at least one processor and at least one memory, the memory serving to store program instructions corresponding to the operations of the system. As shown, an operation can be implemented in whole or in part using program instructions accessible by a module. The modules are connected to a communication path 2B05, and any operation can communicate with any other operations over communication path 2B05. The modules of the system can, individually or in combination, perform method operations within system 2B00. Any operations performed within system 2B00 may be performed in any order unless as may be specified in the claims.

The shown embodiment implements a portion of a computer system, presented as system 2B00, comprising one or more computer processors to execute a set of program code instructions for processing computing workloads that are deployed across different cloud providers (module 2B10) and modules for accessing memory to hold program code instructions to perform: analyzing a computing workload and deploying a first portion of the computing workload onto a first computing infrastructure of a first computing cloud (module 2B20); analyzing the computing workload and deploying a second portion of the computing workload onto a second computing infrastructure of a second computing cloud, wherein the deploying is based at least in part on computing capabilities of computing nodes of the first and second computing infrastructure (module 2B30). In some embodiments, the operations further include taking resource measurements as the time-metered software is executing on the two distinct computing clouds (module 2B40).

Figure 2C:
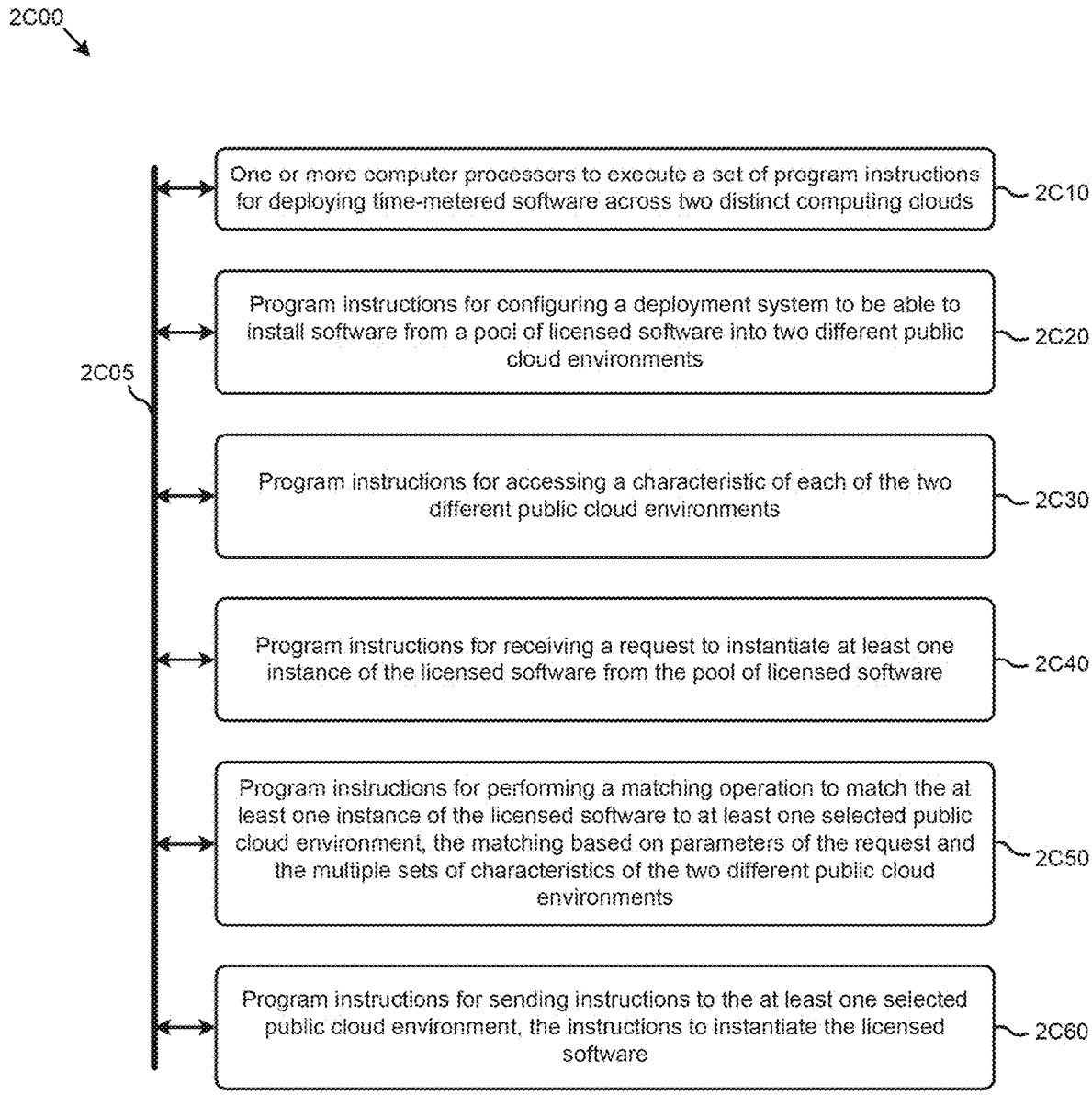
FIG. 2C presents a system that is used to process computing workloads that are deployed across different cloud providers, according to an embodiment.

FIG. 2C presents a system 2C00 that is used to process computing workloads that are deployed across different cloud providers. As an option, one or more variations of system 2C00 or any aspect thereof may be implemented in the context of the architecture and functionality of the embodiments described herein. The system 2C00 or any aspect thereof may be implemented in any environment.

More specifically, FIG. 2C depicts a block diagram of a system to perform certain functions of a computer system. As an option, the system 2C00 may be implemented in the context of the architecture and functionality of the embodiments described herein. Of course, however, the system 2C00 or any operation therein may be carried out in any desired environment.

The system 2C00 comprises at least one processor and at least one memory, the memory serving to store program instructions corresponding to the operations of the system. As shown, an operation can be implemented in whole or in part using program instructions accessible by a module. The modules are connected to a communication path 2C05, and any operation can communicate with any other operations over communication path 2C05. The modules of the system can, individually or in combination, perform method operations within system 2C00. Any operations performed within system 2C00 may be performed in any order unless as may be specified in the claims.

The shown embodiment implements a portion of a computer system, presented as system 2C00, comprising one or more computer processors to execute a set of program code instructions (module 2C10) for deploying time-metered software across two distinct computing clouds, and modules for accessing memory to hold program code instructions to perform: configuring a deployment system to be able to install software from a pool of licensed software into two different public cloud environments (module 2C20); accessing a characteristic of each of the two different public cloud environments (module 2C30); receiving a request to instantiate at least one instance of the licensed software from the pool of licensed software (module 2C40); based on the request and the characteristic of each of the two different public cloud environments, performing a matching operation to match the at least one instance of the licensed software to at least one selected public cloud environment, the matching based on parameters of the request and multiple sets of characteristics of the two different public cloud environments (module 2C50); and sending instructions to the at least one selected public cloud environment, the instructions to instantiate the licensed software (module 2C60).

Figure 2D:
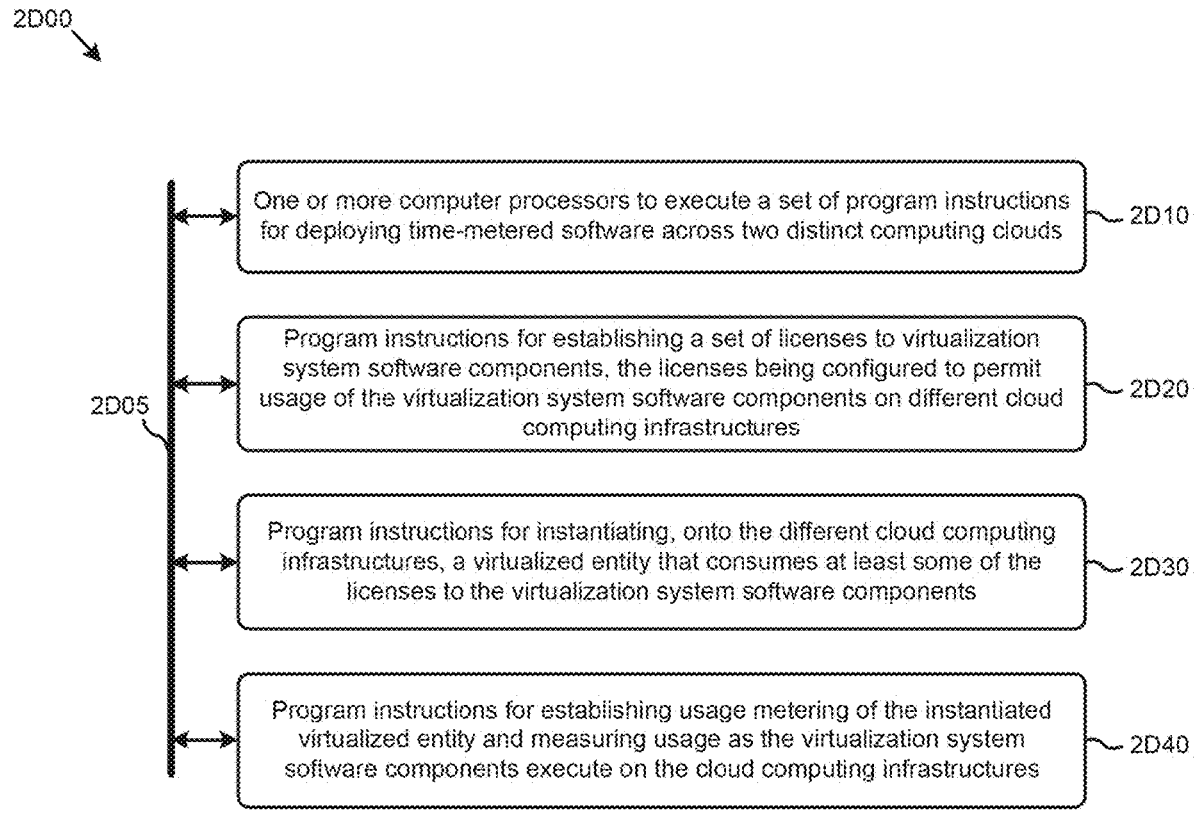
FIG. 2D presents a system that is used to establish metering of virtualized entities that are running on two different sets of cloud provider infrastructure, according to an embodiment.

FIG. 2D presents a system that is used to establish metering of virtualized entities that are running on two different sets of cloud provider infrastructure. As an option, one or more variations of system 2D00 or any aspect thereof may be implemented in the context of the architecture and functionality of the embodiments described herein. The system 2D00 or any aspect thereof may be implemented in any environment.

FIG. 2D depicts a block diagram of a system for deploying licensed software into public computing clouds. As an option, the system 2D00 may be implemented in the context of the architecture and functionality of the embodiments described herein. Of course, however, the system 2D or any operation therein may be carried out in any desired environment.

The system 2D00 comprises a plurality of modules, a module comprising at least one processor and a memory (module 2D10), each connected to a communication link 2D05, and any module can communicate with other modules over communication link 2D05. The modules of the system can, individually or in combination, perform method steps within system 2D00. Any method steps performed within system 2D00 may be performed in any order unless as may be specified in the claims.

As shown, system 2D00 implements a method for deploying time-metered software across two distinct computing clouds, the system 2D00 comprising a module for: establishing a set of licenses to virtualization system software components, the licenses being configured to permit usage of the virtualization system software components on different cloud computing infrastructures (module 2D20). The different cloud computing infrastructures may correspond to different public clouds or they may be a mixture of public and private clouds.

Another module (module 2D30) is provided for instantiating, onto the different cloud computing infrastructures, a virtualized entity that consumes at least some of the licenses to the virtualization system software components. Yet another module (module 2D40) is provided for establishing usage metering of the instantiated virtualized entity and measuring usage as the virtualization system software components execute on the cloud computing infrastructures.

Figure 3:
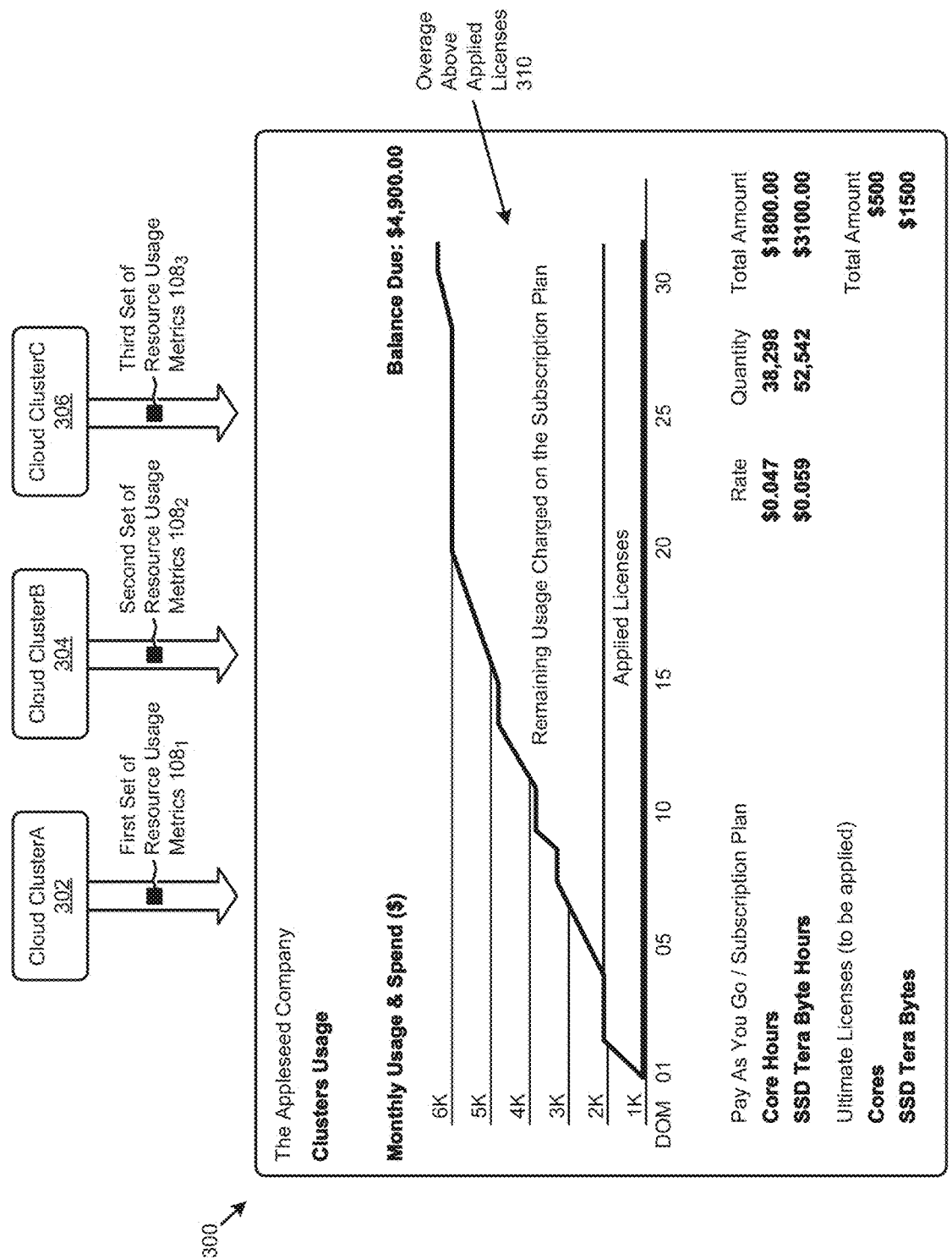
FIG. 3 is a diagram that shows how licensed floating component usage measurements from different clouds are amalgamated into a single usage summary chart, according to an embodiment.

FIG. 3 is a diagram that shows how licensed floating component usage measurements from different clouds are amalgamated into a single usage summary chart 300. As an option, one or more variations of making the floating component usage measurements or any aspect thereof may be implemented in the context of the architecture and functionality of the embodiments described herein. The taking of usage measurements and/or the amalgamation into a single usage summary chart or any aspect thereof may be implemented in any environment.

The figure is being presented to illustrate how a capacity-based pricing model can be implemented across multiple clouds. Moreover the figure is being presented to illustrate how a capacity-based pricing model can be implemented using any of the techniques disclosed herein.

In this example, there are three clusters (e.g., cloud clusterA 302, cloud clusterB 304, cloud clusterC 306) in operation by the customer, "The Appleseed Company". Each of the three clusters have been deployed to different clouds. The usage summary chart amalgamates resource usages from the three different clouds. This is shown by the first set of resource usage metrics $108_1$ (from cloudA), the second set of resource usage metrics $108_2$ (from cloudB), and the third set of resource usage metrics $108_3$ (from cloudC), as inputs to the chart.

As shown, a line representing cumulative usage over the month (e.g., from the first day of the month (DOM) to the last day of the month) is increasing from $0 as of the first day of the month to $6900 as of the last day of the month. The client has already paid for usage of cores and reserved capacity of storage (shown as "Ultimate Licenses" for "Cores" and "SSD Tera Bytes", respectively), thus the amount billed to the customer for the month is $6900 (total consumption) minus $2000 (pre-paid consumption)=$4900 (overage above applied licenses 310). This overage is shown in the figure as "Remaining Usage Changed on the Subscription Plan". In this example, the customer would receive a separate bill from each of three different cloud providers.

In some cases, it is convenient for a customer to see a time-wise granular breakdown of overage over the month. A billing report with such a time-wise granular breakdown is shown and described as pertains to FIG. 4A.

Figure 4A:
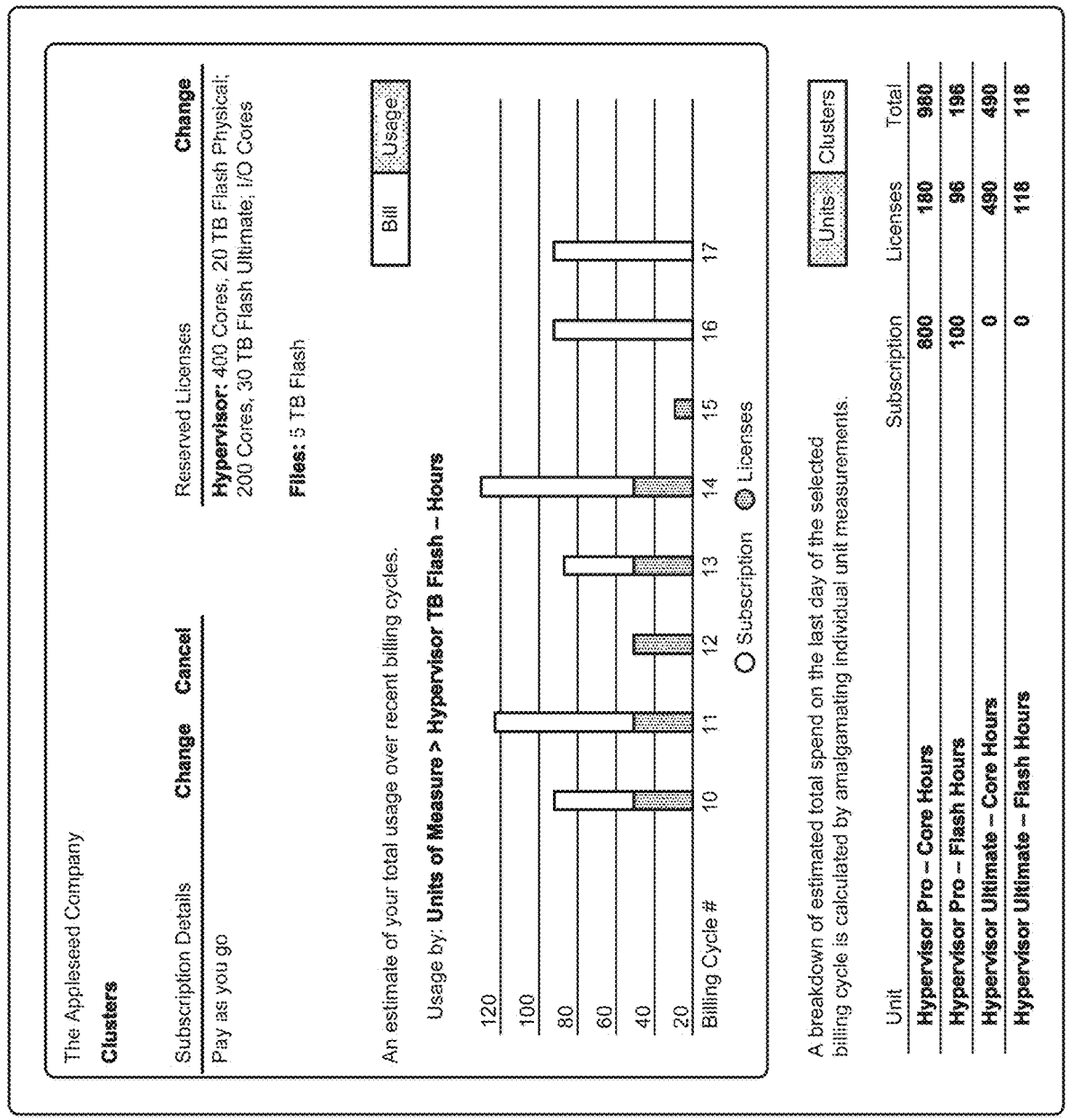
FIG. 4A exemplifies a stack-oriented billing report showing historical usage summaries that result from processing usage measurements, according to an embodiment.

FIG. 4A exemplifies a stack-oriented billing report 4A00 showing historical usage summaries that result from processing usage measurements. As an option, one or more variations of stack-oriented billing report or any aspect thereof may be implemented in the context of the architecture and functionality of the embodiments described herein. The stack-oriented billing report or any aspect thereof may be implemented in any environment.

The stack-oriented billing report 4A00 includes several column-chart entries corresponding to specific dates throughout a month. The different shading in the shown columns correspond to different billing models. In this particular example, some portion of the usage for the month is tallied in accordance with "Reserved Licenses" while other portions of the usage for the month are tallied against a "Subscription" model.

In addition to the column-chart entries, a text-oriented area is provided in the report to provide details of usages of (1) lower-level virtualization system software components (e.g., hypervisor instances) or alternatively, (2) higher-level virtualized entities (e.g., clusters).

In some situations, historical usages exhibit seasonal patterns that can be used to forecast usages in a future period. A forecasted usage chart is shown and described as pertains to FIG. 4B.

Figure 4B:
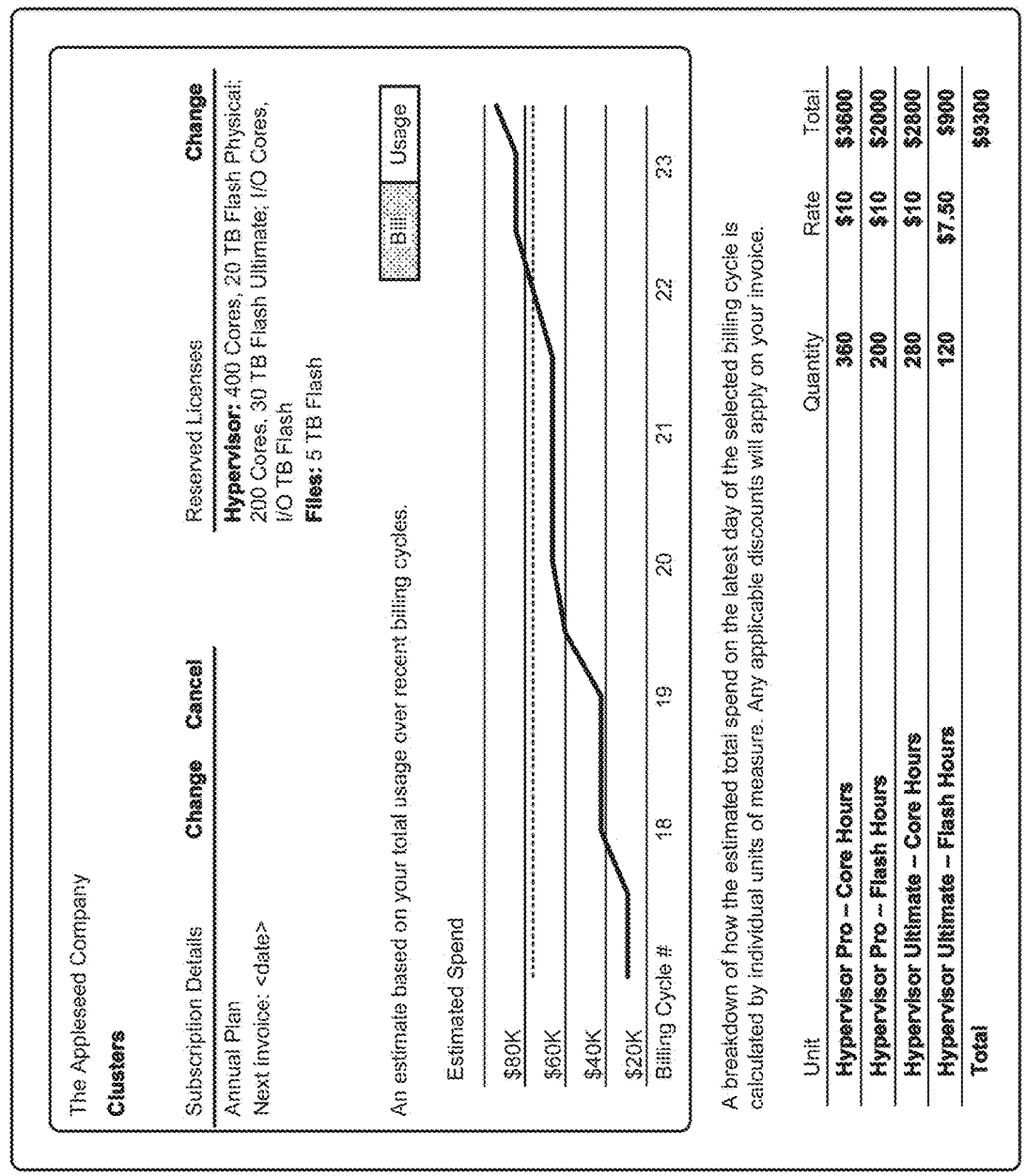
FIG. 4B exemplifies a forecasted usage chart that derives from historical usage measurements of various virtualization system software components, according to an embodiment.

FIG. 4B exemplifies a forecasted usage chart 4B00 that derives from historical usage measurements of various virtualization system software components. As an option, one or more variations of the forecasted usage chart or any aspect thereof may be implemented in the context of the architecture and functionality of the embodiments described herein. The forecasted usage chart or any aspect thereof may be implemented in any environment.

In this particular example, the granularity of the forecast is by week, and the forecast covers seven weeks. The estimate/forecast is based on usage in recent periods. Seasonality over time, including periodicity within a weekly cycle, are considered when making the forecast.

The foregoing charts of FIG. 4A and FIG. 4B pertain to amounts that the vendor of the virtualization system software components would invoice to a customer. However, the cloud infrastructure provider may invoice the same customer separately.

Figure 5A:
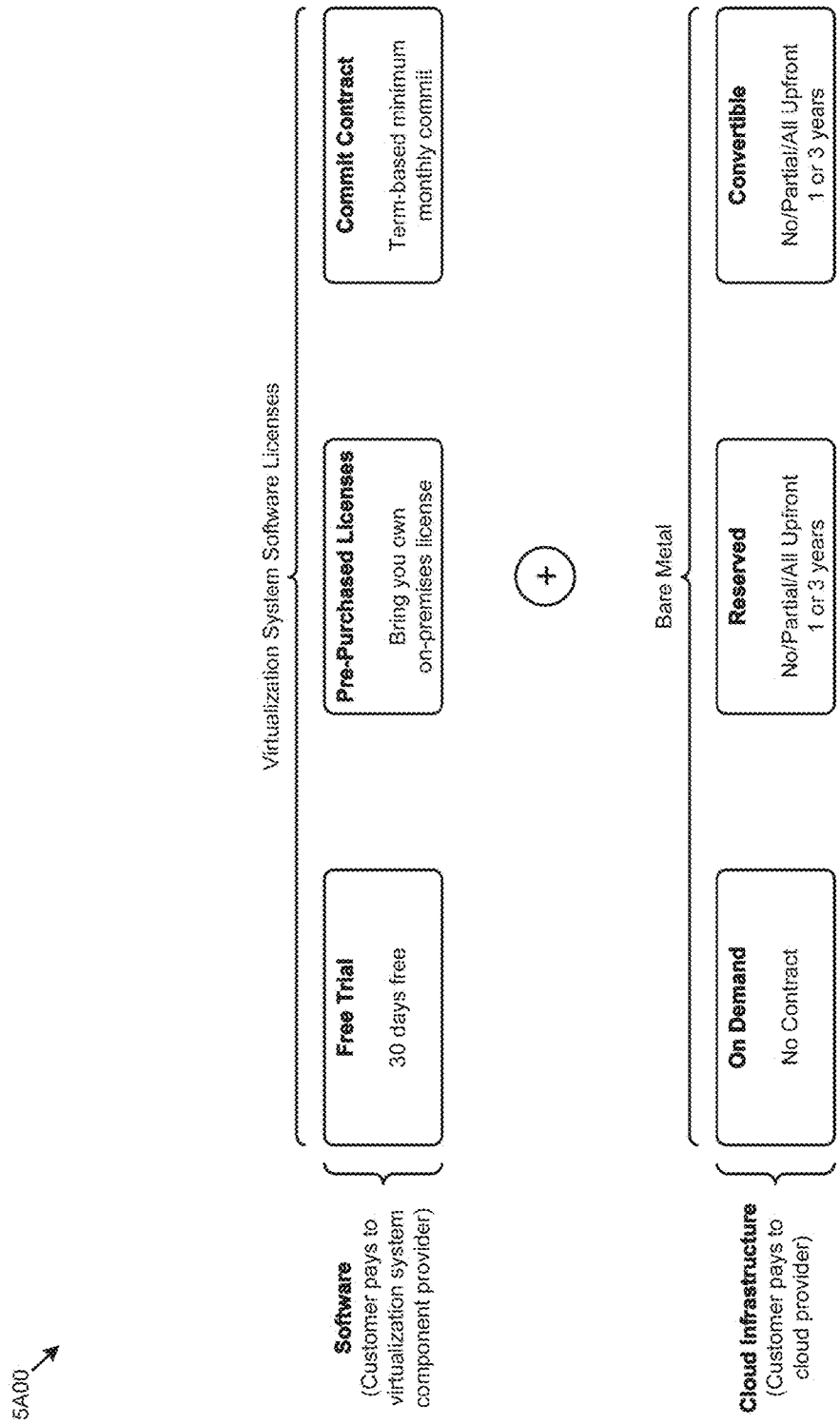
FIG. 5A presents an example of an unbundled billing model that facilitates invoicing for use of licensed virtualization system software components separately from invoicing for use of cloud infrastructure resource usage, according to an embodiment.

FIG. 5A presents an example 5A00 of an unbundled billing model that facilitates invoicing for use of licensed virtualization system software components separately from invoicing for use of cloud infrastructure resource usage. As an option, one or more variations of the unbundled model or any aspect thereof may be implemented in the context of the architecture and functionality of the embodiments described herein. The unbundled model or any aspect thereof may be implemented in any environment.

The figure is being presented to illustrate how usage of the virtualization system component software can be billed separately from bills pertaining to usage of the cloud infrastructure. In the example shown, the virtualization system component software pertains to a computing cluster based on interoperation of a virtualization system component to form a computing cluster. Any of a range of licensing options can be covered. In particular, the portion of the unbundled billing model that pertains to the "Virtualization System Software Licenses" supports time-bound "Free Trial" licenses and "Pre-purchased Licenses" as well as a "Commit Contract" that specifies a term-based monthly commitment.

Similarly, though strictly as an example, the billing model for the "Bare Metal" pertains to computing hardware that is used to run the virtualization system software components that form a computing cluster. Any of a range of licensing options can be covered by the billing model for "Bare Metal". In particular, billing can be based on "On Demand" licenses for which no upfront contract is required, "Reserved" licensing under which a customer pays at a rate lower than "On Demand" (but on a use-it-or-lose it basis with respect to a level of commitment), and/or "Convertible" licensing, under which some portion of "On Demand" licensing can be converted into the lower rate "Reserved" option.

The foregoing unbundled billing model supports a wide range of deployment use cases where virtualization system software components are deployed onto bare metal hardware. Some of such deployment use cases are shown and described as pertains to FIG. 5B.

Figure 5B:
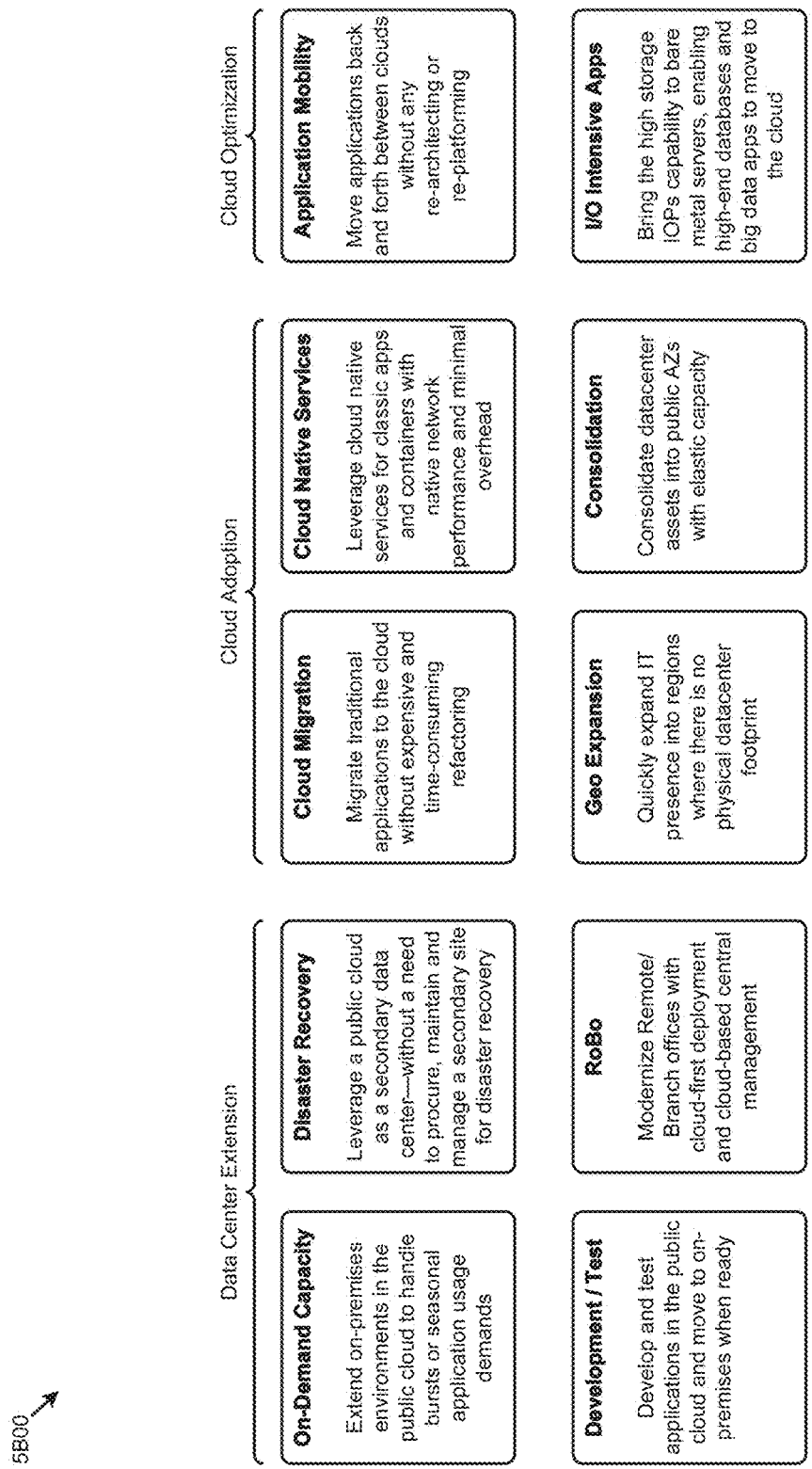
FIG. 5B presents an example set of deployment use cases that are used in systems that measure usage of licensed virtualization system software components separately from measuring usage of cloud infrastructure resources, according to an embodiment.

FIG. 5B presents an example set of deployment use cases 5B00 that are used in systems that measure usage of licensed virtualization system software components separately from measuring usage of cloud infrastructure resources. As an option, one or more variations of the deployment use cases or any aspect thereof may be implemented in the context of the architecture, functionality, and embodiments described herein. The deployment use cases or any aspect thereof may be implemented in any environment.

The figure is being presented to illustrate how the nature of unbundled billing, as well as the nature of underlying unbundled usage metering facilitates data center extensions, cloud adoption, and cloud optimization. Specifically, and as shown, each motivation (e.g., data center extensions, cloud adoption, and cloud optimization) has a set of use cases. Each of the use cases takes advantage of the nature of unbundled billing. Moreover, in use cases where deployment of the virtualization system software components is under control of the virtualization system component vendor, the use models are facilitated by a lift and shift regime. In a lift and shift regime, an entire cluster running at a first cloud can be temporarily suspended from execution, checkpointed for its execution state, hibernated, then moved to a different, second cloud facility, after which it can be brought out of hibernation and resumed from the checkpointed execution state.

Further details regarding general approaches to using lift and shift are described in U.S. patent application Ser. No. 16/778,909 titled "HYPERVISOR HIBERNATION", filed on Jan. 31, 2020, which is hereby incorporated by reference in its entirety.

FIG. 5C presents an example set of consumption models 5C00 that are used in systems that measure consumption of floating licenses for virtualization system software components. As an option, one or more variations of consumption models or any aspect thereof may be implemented in the context of the architecture and functionality of the embodiments described herein. The consumption models or any aspect thereof may be implemented in any environment.

The figure is being presented to illustrate how any number or type of floating licenses for virtualization system software components can float between consumption models based on actual measured usage. The figure shows three consumption models, "Hybrid Licenses", "Pay As You Go", and "Commit Contracts", each with different sets of commercial characteristics. A customer might have negotiated commercial arrangements under any or all of the consumption models. Licenses for virtualization system software components can float between one consumption model to another consumption model seamlessly.

As one example, suppose that a customer has a term-based license to use one hypervisor. Further suppose that, during deployment of a computing cluster in accordance with the customer's specification, an additional hypervisor is needed to run on a second node. In this case, and assuming prior commercial arrangements are in place, rather than deny the two-node cluster formation (i.e., since there is only one license to use one hypervisor), a second license floats into a pay as you go model. Usage of the second hypervisor is measured and the customer is billed at the pay as you go rate. Alternatively, assuming the customer has a covering "Commit Contract", the second license floats into the applicable "Commit Contract" and the measured usage of the second hypervisor is tallied against the customer's commit amount.

Any aspects of the foregoing models can be facilitated and/or enforced by modules of a licensing and provisioning facility. In some cases, different modules of a licensing and provisioning facility are distributed over different computing infrastructure. Moreover, different modules of a licensing and provisioning facility may be configured for, and situated on, specific infrastructure so as to gather usage data and/or to relate to the gathered usage data pertaining to any particular licensing model.

Strictly as examples, different modules of a licensing and provisioning facility may be configured for (1) determination if there is a requirement to have a subscription plan with credit card or purchase order on file; (2) provisioning of instrumentation for software add-ons; (3) provisioning centralized or distributed maintenance agents pertaining to the logic that is used to determine the amount to be billed (e.g., via subtracting the allocated licenses); (4) handling license refresh and renewals; (5) handling expansion and shrinking of clusters, such that usage metering and billing are automatically handled; (6) permitting changes to and/or specification of additional payment modes such as via account payments; (7) handling of user-defined licensing and subscription workflows; (8) maintenance and security of licensing and subscription portals; (9) handling selection of a user-defined granularity and/or periodicity of metering and reporting; (10) handling user-defined selection of metering and reporting preferences (for example, a minimum of desired vs. actual capacity); (11) offering visibility to cluster-specific costs and usage at any specified level of granularity; (12) handling customer onboarding (e.g., during onboarding, the customer might select a default model, or might select a subscription plan and/or might allocate pre-purchased licenses into the floating model); (13) handling deferred selection of subscription plans; (14) handling automated cluster creation (e.g., handling ephemeral cluster creation to handle seasonal or periodic workload demands); (15) handling user-selection (e.g., manual or automatic) of product edition upgrades; (16) amalgamating licenses at an account level; (17) automating application of licenses upon virtualized entity creation; (18) automating cluster, node or other higher-level entity usage metering; (19) automating notification of upgrades and/or other customer notifications (e.g., if the cluster is a cluster that is licensed at a basic level, but starts using add-on features, violations or overages are shown in the cluster, the cluster portal, and the billing center); (20) automating cluster expansion or contraction warnings (e.g., automatic detection of an event when an administrator tries to expand a cluster or create a new cluster without enough licenses; and/or (21) automating generation and emission of license breach warning messages.

Various rows as shown FIG. 5C refer to methods of procurement and methods of billing. Examples of procurement methods and billing methods are shown and described as pertains to FIG. 5D1 and FIG. 5D2.

FIG. 5D1 and FIG. 5D2 present an example set of procurement and billing workflows (e.g., workflow 5D100 and workflow 5D200, respectively), that are used in systems that measure consumption of floating licenses for virtualization system software components. As an option, one or more variations of procurement and billing workflows or any aspect thereof may be implemented in the context of the architecture and functionality of the embodiments described herein. The procurement and billing workflows or any aspect thereof may be implemented in any environment.

In the particular example of FIG. 5D1, hybrid licenses (e.g., licenses that can float between private computing clouds and public computing clouds) can be procured through a selling channel or distributor. In some cases, a selling channel or distributor may offer on-premises licenses at discounts. Alternatively, a direct online selling channel or distributor may offer a lower rate (but use-it-or-lose-it) commit contracts and/or may offer a higher rate (but commitment free) pay as you go arrangements. Any of the foregoing licenses and/or arrangements support floating licenses. Any number of licensed floating virtualization system software components can be deployed to form any one or more virtualized entities that run on bare metal. In some cases, even if the number of licensed floating virtualization system software components or the license type is breached, the deployment can execute on the bare metal while being measured. Only the usage that is actually in excess of that permitted by existing licenses is charged to the customer.

One method for charging the customer only the usage that is actually in excess of that permitted by existing licenses is shown and described as pertains to FIG. 5D2. Specifically, the method commences at a point in time after a virtualized entity has executed for a period of time. The resources consumed by execution of the virtualized entity—possibly involving multiple clouds and/or possibly involving a hybrid cloud environment—are aggregated (step 550). Then, amounts corresponding to consumed resources for which the customer already has then-current, paid-up licenses are subtracted (step 552). The customer is then charged amounts only for the portion of consumed resources that are actually in excess of that permitted by existing licenses (step 554).

Figure 6A:
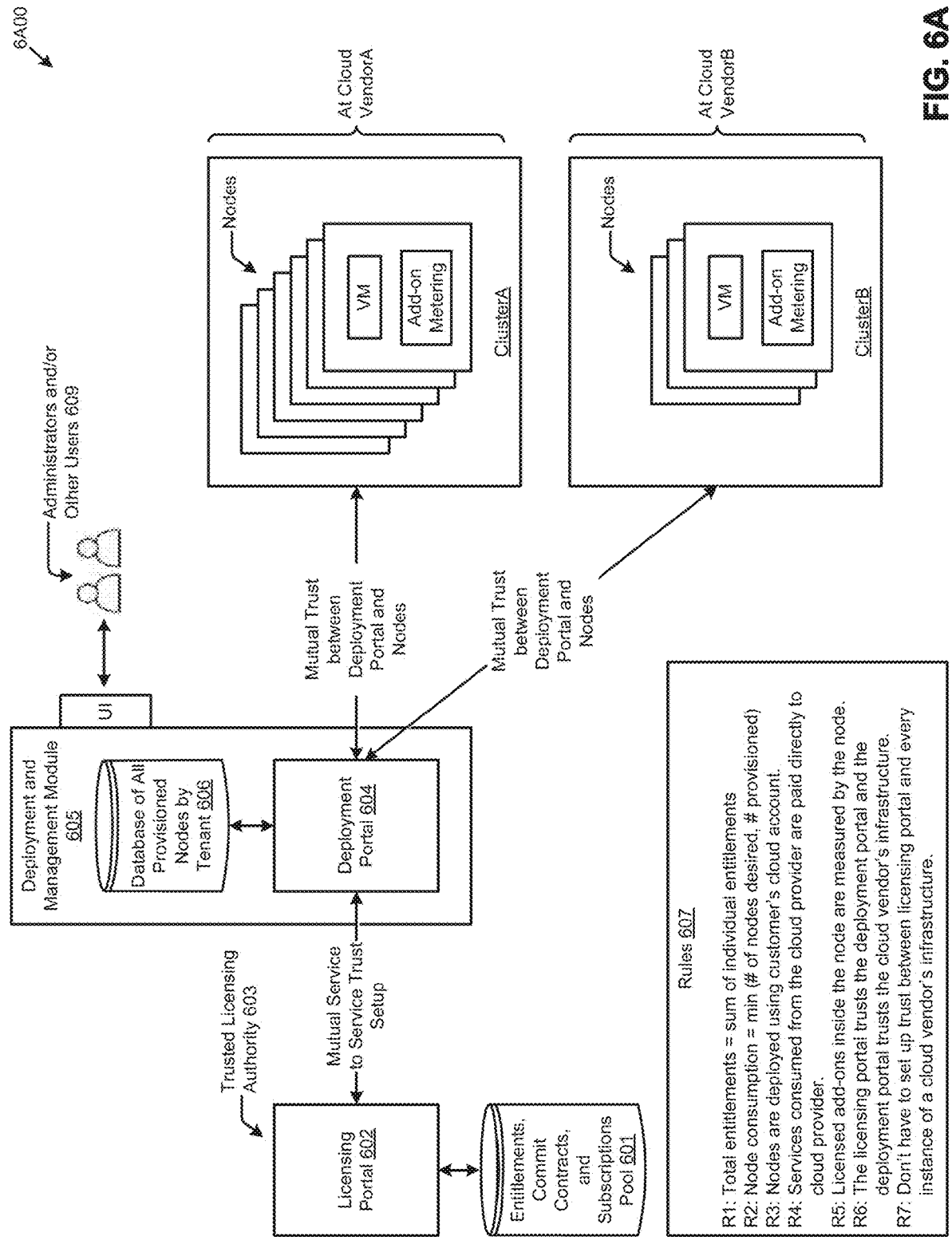
FIG. 6A, FIG. 6B, and FIG. 6C present licensing and provisioning systems, according to some embodiments.

FIG. 6A presents a licensing and provisioning system 6A00. As an option, one or more variations of the shown licensing and provisioning system 6A00 or any aspect thereof may be implemented in the context of the architecture and functionality of the embodiments described herein. The licensing and provisioning system 6A00 or any aspect thereof may be implemented in any environment.

The figure is being presented to illustrate how collections of interconnected components can be used to implement any of the heretofore-described techniques for managing licensed floating virtualization system software components. More specifically, FIG. 6A is being presented to illustrate how licensed floating virtualization system software components can be deployed to different clouds in accordance with a set of rules 607.

The shown collection of interconnected components supports methods for deployment of licensed floating virtualization system software components across two distinct public computing cloud environments (e.g., the shown cloud vendorA and cloud vendorB). The embodiment shown includes a pool 601 for storing entitlements (e.g., paid-up licenses to the licensed software, subscribed-to licenses, minimum commit contract licenses, etc.). Any individual entitlement can correspond to a running instance of the licensed software. As such, since there is a pool of entitlements to licensed software, and since the architecture supports communication between deployment and management module 605 and any number of public clouds, the deployment and management module can deploy a first set of licensed software (e.g., to form clusterA) onto a first computing infrastructure of a first computing cloud (e.g., cloudA), and can deploy a second set of licensed software (e.g., to form clusterB) onto a second computing infrastructure of a second computing cloud (e.g., cloudB). In doing so, the deployment and management module may decrement entitlements when deploying a floating license to a cloud, and may increment entitlements when a licensed virtualization entity is destroyed or suspended in a manner that releases the corresponding floating license.

The determination of where to deploy the licensed software (e.g., together with corresponding entitlements), can be made based at least in part on characteristics of the first computing infrastructure and the second computing infrastructure. Strictly as one example, the first computing infrastructure might have relatively higher-performing cores and more costly nodes, whereas the second computing infrastructure might have relatively lower-performing cores and less costly nodes. In such a case, the deployment and management module might determine that only some portion of a computing workload is to be deployed to the relatively higher-performing and more costly nodes whereas the remaining portion of the computing workload is deployed to the relatively lower-performing and less costly nodes. As such, the billings seen by the customer can be optimized against some cost/performance optimization function. Moreover, the matching can be undertaken by considering any of a variety of workload parameters (e.g., demand characteristics of the computing workload) with respect to any sort of cloud parameters (e.g., computing capability of the computing infrastructure).

In some cases, the cloud parameters may refer to a number of allocatable nodes and/or capabilities of those available nodes. In some cases, the cloud parameters may refer to commercial considerations such as costs or rates for CPU usage, costs or rates for random access storage, costs or rates for object storage, and/or costs or rates for networking facilities. In some cases, the cloud parameters may refer to aspects of a commercial relationship between the deployer and the target cloud, such as "Is there an account or subscription entitlement that allows the deployer to allocate infrastructure components?"

Strictly as further examples, a workload parameter referring to a high demand for IOPS might be considered with respect to a candidate target cloud that has a high IOPS capability. As another example, any of a wide variety of workload parameters might be considered with respect to cloud parameters referring to, or involving any one or more of, a number of allocatable IP addresses, an availability of a node that is configured with specialized hardware (e.g., a graphics processing unit (GPU)), a storage capacity, a cost or rate for ingress bandwidth, a cost or rate for egress bandwidth, an availability of an existing account or type of account, or existence of a purchase order or credit card on file, or any other individual or combination of cloud parameters.

In some cases, a workload may comprise different computing tasks that consume different types of resources. In some cases, such a workload can be split into a first and second portion, and the portions can be then distributed across different clouds. In this embodiment, the deployment and management module 605 might facilitate determination of where to deploy the first and second portions of a workload based on demand characteristics of the computing workload with respect to any sort of computing capability of the computing infrastructure, and/or other criteria as well. In fact, the deployment and management module might determine sets of heterogeneous aspects between the first computing infrastructure the second computing infrastructure such that further differences between the first computing infrastructure the second computing infrastructure can be exploited for cost/performance benefits. In some embodiments, the licensed software has a corresponding set of licensed features that are in turn associated with the entitlements that are drawn from the pool of licensed software that is populated based on communications with a licensing portal 602.

The licensing portal 602 interacts with deployment portal 604 to establish a mutual trust relationship such that the deployment portal considers the licensing portal to be a trusted licensing authority 603. As such, since the licensing portal trusts the deployment portal, and since the deployment portal trusts the nodes of the cloud vendor's infrastructure, it is unnecessary to establish trust between the licensing portal and every instance of a node at the cloud.

The deployment and management module is configured to (1) deploy a first instance of metering code that takes licensed floating component usage measurements at the first infrastructure, and to (2) deploy a second instance of the metering code that takes licensed floating component usage measurements at the second infrastructure. The first instance of the metering code and the second instance of the metering code communicate over a trusted Internet connection with the deployment and management module. In some situations, at least one of the first instance of the metering code or the second instance of the metering code communicates over a custom protocol with the deployment and management module, which in turn communicates with a licensing portal using the same trust mechanism and trust level as the trusted Internet connection with the first instance of metering code. In the shown embodiment, it is also possible that the metering code communicates (directly or indirectly) with a licensing portal. Moreover, such metering code can take usage measurements in accordance with at least two tiers, the at least two tiers comprising a first tier corresponding to a software feature entitlement and a second tier corresponding to usage-based measurements of that software feature when it is deployed to a computing core.

Costs can be optimized based on node capabilities at the different clouds. Moreover, an optimization function can consider any of the entries in a database of provisioned nodes by tenant 606 to determine real-time, ongoing node status such that the node status corresponds to then-current status of nodes within the first computing infrastructure or the second computing infrastructure. In fact, node status can include states corresponding to "ready", or "running", or "overloaded", or "condemned".

Accommodation in billing can be provided based on occurrence of a condemned node. In some cases a condemned node is operational, but for some reason is not performing as expected. In such cases, a replacement node might be provisioned to supplant or replace the condemned node. To this end, the deployment portal 604 maintains a threshold of performance for the nodes, and the deployment portal considers usage-based measurements in combination with the threshold of performance. Accordingly, it can happen that an account/customer might see accommodation for a poorly-performing node even though the account/customer might not have been able to observe any change in expected performance of the licensed software.

As shown, the computing infrastructure includes a first computing infrastructure "ClusterA" (e.g., in AWS) and a second computing infrastructure "ClusterB" (e.g., in Azure), however the deployment and management module is able to deploy to any sorts of infrastructure. As such it can happen that the first computing infrastructure comprises bare metal nodes of a first type, and the second computing infrastructure comprises bare metal nodes of a second type. Accordingly, performance thresholds and other metering and billing metrics can be adjusted based on characteristics of the first bare metal node type or the second bare metal node type. In fact, if/when some low performance is detected, the deployment portal can deploy a yet different set of the licensed software onto the first computing infrastructure of a first computing cloud, and can deploy the remainder of the licensed software needed for a particular workload onto a second computing infrastructure of a second computing cloud.

Metered usage from any infrastructure (e.g., two or more clouds) can be received by deployment and management module 605. Moreover, any deployment conditions, error or warning notifications, billing issues, reports, etc. can be accessed via a user interface of the deployment and management module. More specifically, administrators and/or other users 609 can view reports and/or make changes to the licensing parameters through the aforementioned user interface.

The shown set of rules 607 can be applied to facilitate deployment, operation, measurement gathering, and security. Some portions of the set of rules might refer to the method of calculations as used in billing. Specifically, and as shown, rule "R1" indicates that a total of entitlements can be calculated as a sum of individual entitlements. Rule "R2" indicates that node consumption equals the minimum between the number of nodes requested compared to the number of nodes provisioned. This handles the case where a customer specifies a larger cluster than the customer is entitled to. In this case, based on a pre-determined commercial arrangement to deploy within a license scope, when a customer specifies a larger cluster than the customer is entitled to deploy, then the deployment and management module will automatically de-scope the cluster to deploy within the customer's license scope.

Some rules relate to deployment of licensed floating virtualization system software components can be coordinated with that customer's selected public cloud environment. For example, in accordance with rule "R3", when deploying licensed floating virtualization system software components to a cloud, the deployment and management module will allocate hardware using credentials of a pre-established account at the target cloud. In some cases, a single customer has multiple pre-established accounts at multiple different clouds. Rule "R4" provides that whatever cloud infrastructure and/or cloud services are consumed at a particular cloud vendor's site are billed directly to the customer. Rule "R5" provides that additional licensed/measured software or features are measured by add-on metering that is implemented within a node that runs the measured software or features. Rule "R6" provides that the licensing portal and the deployment portal establish mutual trust. Rule "R7" provides that a trust relationship between the deployment and management module and the cloud vendor's interface is established such that a trust relationship with each node on the cloud vendor's infrastructure is imputed.

Figure 6B:
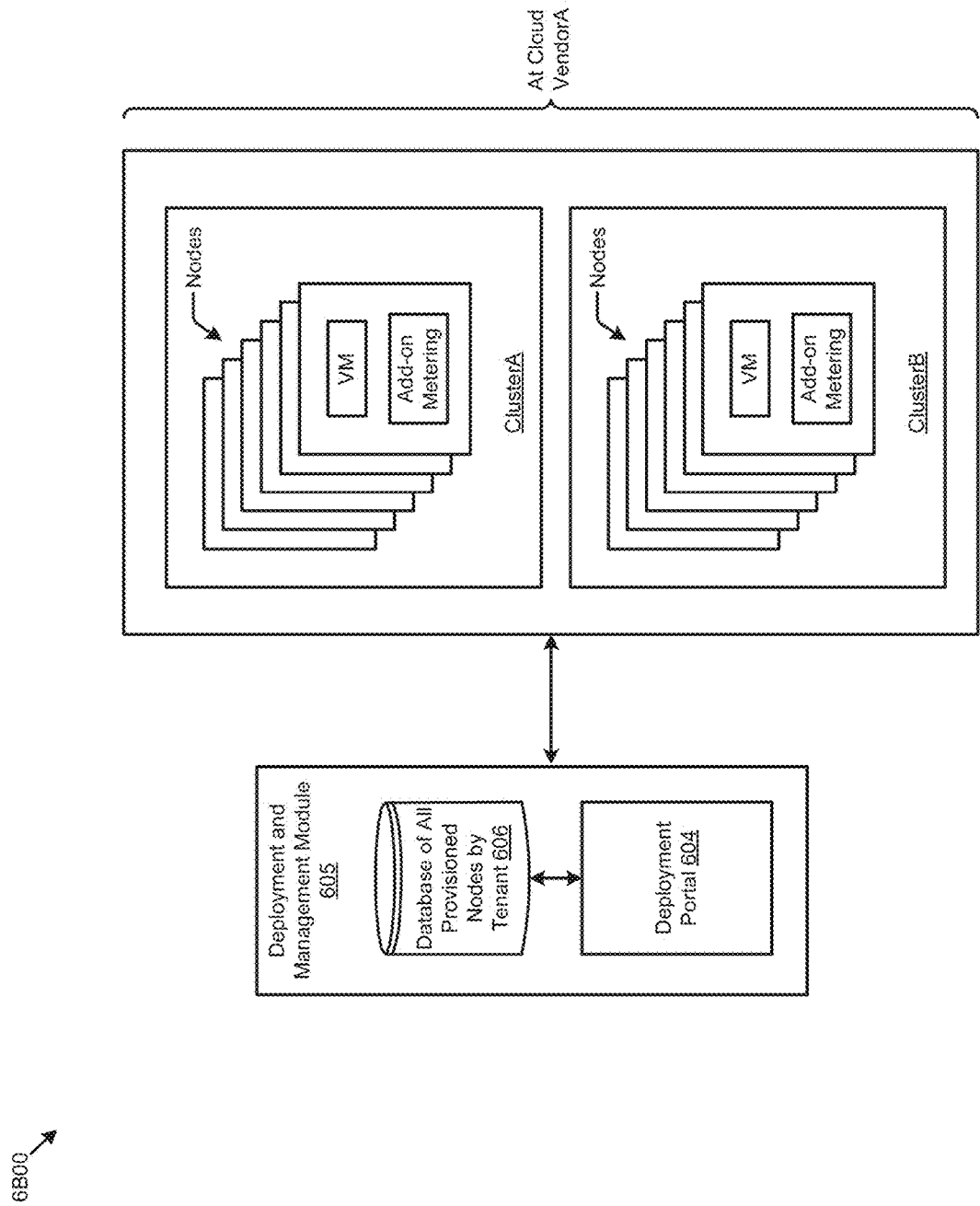

FIG. 6B presents a licensing and provisioning system 6B00. As an option, one or more variations of the shown licensing and provisioning system 6B00 or any aspect thereof may be implemented in the context of the architecture and functionality of the embodiments described herein. The licensing and provisioning system 6B00 or any aspect thereof may be implemented in any environment.

The figure is being presented to illustrate how collections of interconnected components can be used to implement any of the heretofore-described techniques for managing licensed floating virtualization system software components. More specifically FIG. 6B is being presented to illustrate how licensed floating virtualization system software components can be deployed to form multiple clusters in the same cloud.

In this example embodiment, the deployment and management module 605 instructs or otherwise interacts with deployment portal 604 to deploy both clusterA and clusterB onto the cloud infrastructure of cloud vendorA. In some situations, a request for deployment of a higher-level virtualization entity (e.g., a cluster) will automatically cause configuration of as many needed lower-level virtualization system software components to achieve formation of the requested higher-level virtualization entity. As needed, the licensing and provisioning system will manage ingress and egress of floating licenses into and out of the pool. In some cases, this entails one or more acts of checking-out floating licenses from the pool, decrementing license counts, returning floating licenses to the pool, incrementing license counts, moving a floating license from one infrastructure to another infrastructure, etc. As one specific example, when servicing a request for deployment of a higher-level virtualization entity (e.g., a cluster) the system will automatically cause check-out of floating licenses to lower-level virtualization system software components, based on the type and number of lower-level virtualization system software components that are needed to achieve formation of the requested higher-level virtualization entity.

Figure 6C:
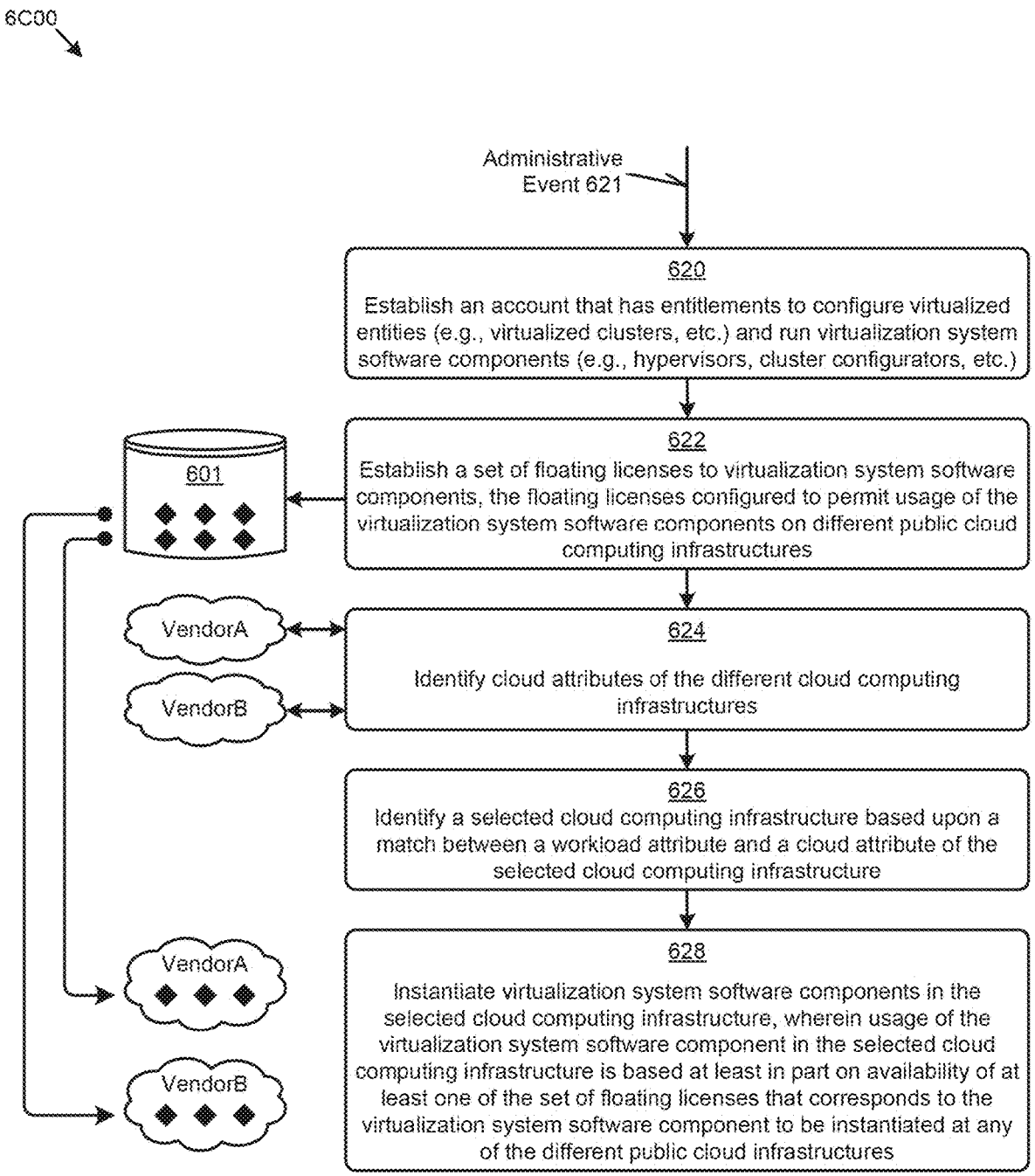

FIG. 6C depicts a licensing and provisioning system 6C00 for instantiating virtualization system components onto different cloud infrastructures. As shown, an administrative event 621 (e.g., establishment of a customer profile) causes a customer account to be established (step 620). In this embodiment, the customer account corresponds to entitlements for configuring and running virtualized entities (e.g., virtualized clusters, etc.) that are formed of virtualization system software components (e.g., hypervisors, cluster configurators, etc.)

In some cases, the entitlements correspond to a set of floating licenses to the aforementioned virtualization system software components, and the floating licenses are configured correspondingly to permit usage of the virtualization system software components on different public cloud computing infrastructures (step 622).

Matching operations (step 624 and step 626) consider the differences and similarities between the different public cloud computing infrastructures. A match between a workload and a particular selected cloud computing infrastructure is established based upon a match between the workload attributes and the cloud attribute of a particular selected one of the different selected cloud computing infrastructures.

Once the matching has been accomplished so as to select from among the different cloud computing infrastructures, then step 628 serves to instantiate virtualization system software components onto or into the selected cloud computing infrastructure. The initial instantiation, as well as ongoing usage of the virtualization system software component in the selected cloud computing infrastructure, is facilitated based at least in part on availability of at least one of the set of floating licenses that corresponds to the virtualization system software component to be instantiated.

In this example, there are available floating licenses in pool 601. More specifically, there are available floating licenses in the pool that correspond to the needed virtualization system software components that are to be instantiated onto the cloud infrastructure of vendorA. In some situations, and as shown, additional virtualization system software components are instantiated to a different cloud computing infrastructure (e.g., the cloud computing infrastructure of vendorB).

System Architecture Overview
Additional System Architecture Examples

Figure 7A:
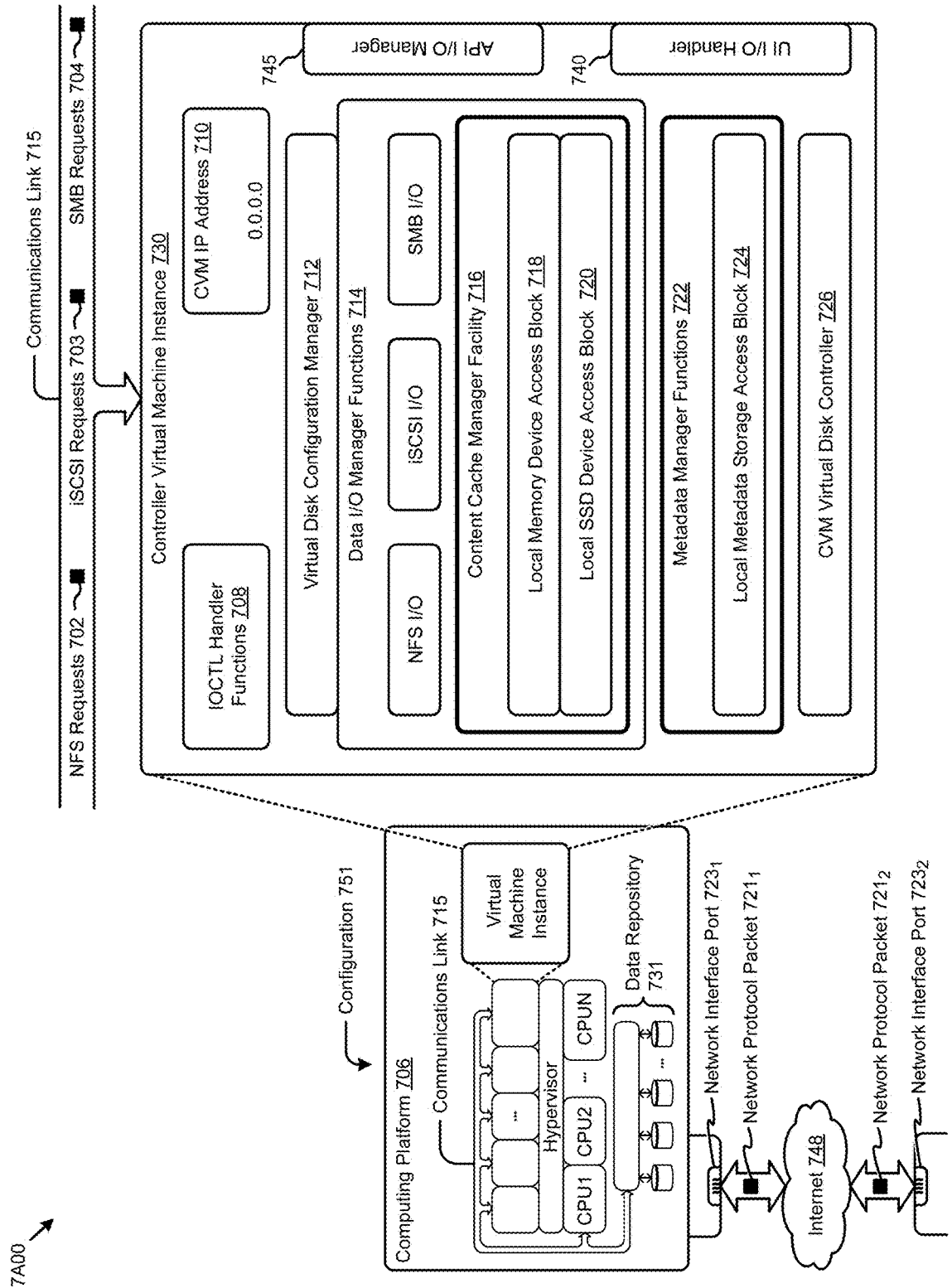
FIG. 7A, FIG. 7B, FIG. 7C, and FIG. 7D depict virtualization system architectures comprising collections of interconnected components suitable for implementing embodiments of the present disclosure and/or for use in the herein-described environments.

FIG. 7A depicts a virtualized controller as implemented by the shown virtual machine architecture 7A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 7A00 comprises a collection of interconnected components suitable for implementing embodiments of the present disclosure and/or for use in the herein-described environments. Moreover, virtual machine architecture 7A00 includes a virtual machine instance in configuration 751 that is further described as pertaining to controller virtual machine instance 730. Configuration 751 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 730.

In this and other configurations, a controller virtual machine instance receives block I/O storage requests as network file system (NFS) requests in the form of NFS requests 702, and/or internet small computer storage interface (iSCSI) block IO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output can be handled by one or more IO control handler functions (e.g., IOCTL handler functions 708) that interface to other functions such as data IO manager functions 714 and/or metadata manager functions 722. As shown, the data IO manager functions can include communication with virtual disk configuration manager 712 and/or can include direct or indirect communication with any of various block IO functions (e.g., NFS IO, iSCSI IO, SMB IO, etc.).

In addition to block IO functions, configuration 751 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through API IO manager 745.

Communications link 715 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 730 includes content cache manager facility 716 that accesses storage locations, possibly including local dynamic random access memory (DRAM) (e.g., through local memory device access block 718) and/or possibly including accesses to local solid state storage (e.g., through local SSD device access block 720).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 731, which in turn can be formatted into any one or more storage areas, and which can comprise parameterized storage accessible by a key (e.g., a filename, a table name, a block address, an offset address, etc.). Data repository 731 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 724. The data repository 731 can be configured using CVM virtual disk controller 726, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 751 can be coupled by communications link 715 (e.g., backplane, LAN, PSTN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port $723_1$ and network interface port $723_2$). Configuration 751 can be addressed through one or more network interface ports using an IP address. Any operational element within computing platform 706 can perform sending and receiving operations using any of a range of network protocols, possibly including network protocols that send and receive packets (e.g., network protocol packet 7211 and network protocol packet 7212).

Computing platform 706 may transmit and receive messages that can be composed of configuration data and/or any other forms of data and/or instructions organized into a data structure (e.g., communications packets). In some cases, the data structure includes program instructions (e.g., application code) communicated through the Internet 748 and/or through any one or more instances of communications link 715. Received program instructions may be processed and/or executed by a CPU as it is received and/or program instructions may be stored in any volatile or non-volatile storage for later execution. Program instructions can be transmitted via an upload (e.g., an upload from an access device over the Internet 748 to computing platform 706). Further, program instructions and/or the results of executing program instructions can be delivered to a particular user via a download (e.g., a download from computing platform 706 over the Internet 748 to an access device).

Configuration 751 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to processing deploying licensed software to a plurality of different clouds in a hybrid cloud setting. In some embodiments, a module may include one or more state machines and/or combinational logic used to implement or facilitate the operational and/or performance characteristics pertaining to processing deploying licensed software to a plurality of different clouds in a hybrid cloud setting.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of processing deploying licensed software to a plurality of different clouds in a hybrid cloud setting). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to processing deploying licensed software to a plurality of different clouds in a hybrid cloud setting, and/or for improving the way data is manipulated when performing computerized operations pertaining to taking and combining licensed floating component usage measurements.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 7B:
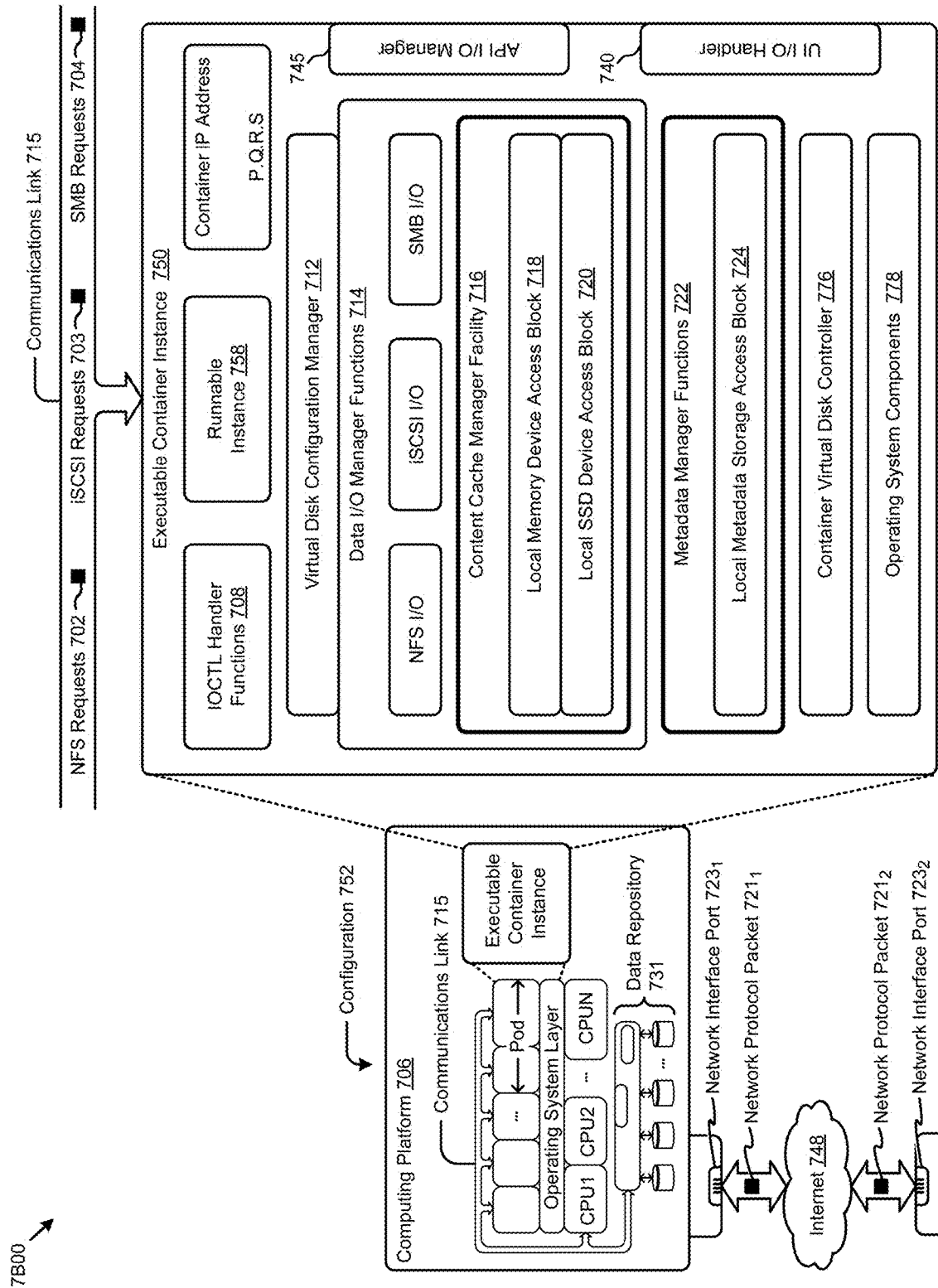

FIG. 7B depicts a virtualized controller implemented by containerized architecture 7B00. The containerized architecture comprises a collection of interconnected components suitable for implementing embodiments of the present disclosure and/or for use in the herein-described environments. Moreover, the shown containerized architecture 7B00 includes an executable container instance in configuration 752 that is further described as pertaining to executable container instance 750. Configuration 752 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 750). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls-a", etc.). The executable container might optionally include operating system components 778, however such a separate set of operating system components need not be provided. As an alternative, an executable container can include runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 7C:
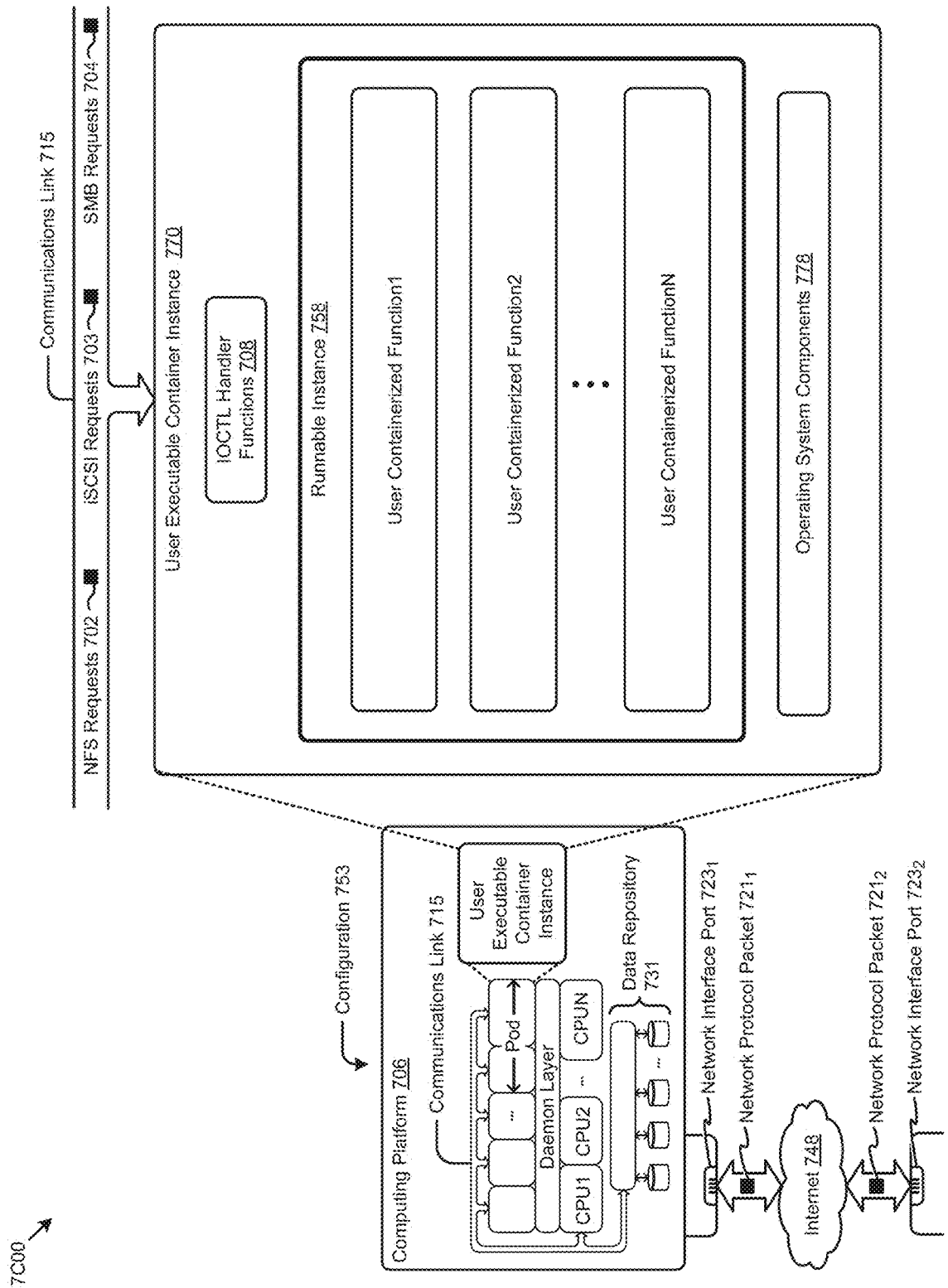

FIG. 7C depicts a virtualized controller implemented by a daemon-assisted containerized architecture 7C00. The containerized architecture comprises a collection of interconnected components suitable for implementing embodiments of the present disclosure and/or for use in the herein-described environments. Moreover, the shown daemon-assisted containerized architecture includes a user executable container instance in configuration 753 that is further described as pertaining to user executable container instance 770. Configuration 753 includes a daemon layer (as shown) that performs certain functions of an operating system.

User executable container instance 770 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 758). In some cases, the shown operating system components 778 comprise portions of an operating system, which portions are interfaced with or included in the runnable instance and/or any user containerized functions. In this embodiment of a daemon-assisted containerized architecture, the computing platform 706 might or might not host operating system components other than operating system components 778. More specifically, the shown daemon might or might not host operating system components other than operating system components 778 of user executable container instance 770.

The virtual machine architecture 7A00 of FIG. 7A and/or the containerized architecture 7B00 of FIG. 7B and/or the daemon-assisted containerized architecture 7C00 of FIG. 7C can be used in any combination to implement a distributed platform that contains multiple servers and/or nodes that manage multiple tiers of storage where the tiers of storage might be formed using the shown data repository 731 and/or any forms of network accessible storage. As such, the multiple tiers of storage may include storage that is accessible over communications link 715. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 751 of FIG. 7A) to manage the interactions between the underlying hardware and user virtual machines or containers that run client software.

Distinct from user virtual machines or user executable containers, a special controller virtual machine (e.g., as depicted by controller virtual machine instance 730) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 7D:
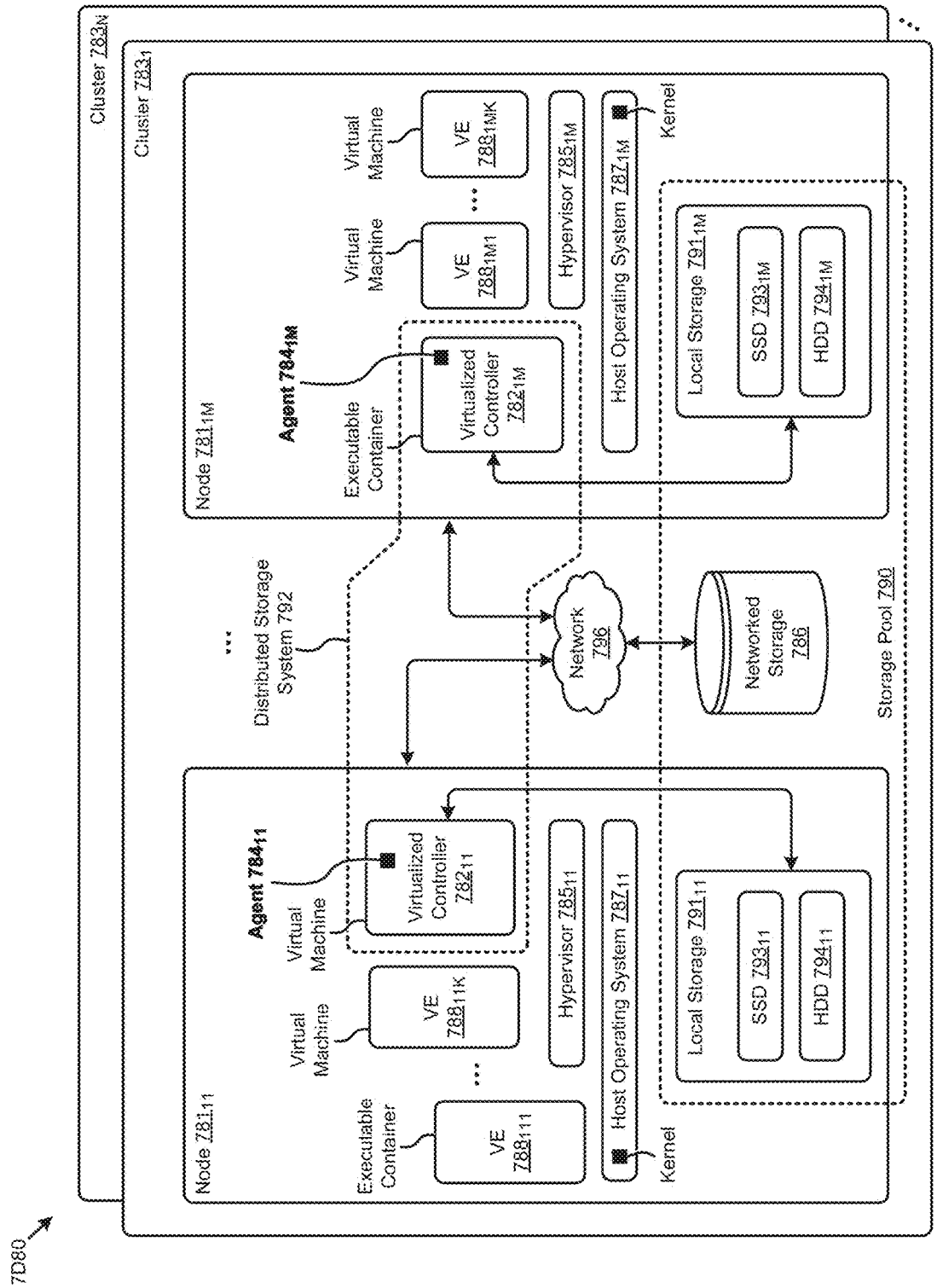

FIG. 7D depicts a distributed virtualization system in a multi-cluster environment 7D80. The shown distributed virtualization system is configured to be used to implement the herein disclosed techniques. Specifically, the distributed virtualization system of FIG. 7D comprises multiple clusters (e.g., cluster $783_1$, . . . , cluster $783_N$) comprising multiple nodes that have multiple tiers of storage in a storage pool. Representative nodes (e.g., node $781_{11}$, . . . , node $781_{1M}$) and storage pool 790 associated with cluster $783_1$ are shown. Each node can be associated with one server, multiple servers, or portions of a server. The nodes can be associated (e.g., logically and/or physically) with the clusters. As shown, the multiple tiers of storage include storage that is accessible through a network 796, such as a networked storage 786 (e.g., a storage area network or SAN, network attached storage or NAS, etc.). The multiple tiers of storage further include instances of local storage (e.g., local storage $791_{11}$, . . . , local storage $791_{1M}$). For example, the local storage can be within or directly attached to a server and/or appliance associated with the nodes. Such local storage can include solid state drives (SSD $793_{11}$, . . . , SSD $793_{1M}$), hard disk drives (HDD $794_{11}$, . . . , HDD $794_{1M}$), and/or other storage devices.

As shown, any of the nodes of the distributed virtualization system can implement one or more user virtualized entities (e.g., VE $788_{111}$, . . . , VE $788_{11K}$, . . . , VE $788_{1M1}$, . . . , VE $788_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $787_{11}$, . . . , host operating system $787_{1M}$), while the VMs run multiple applications on various respective guest operating systems. Such flexibility can be facilitated at least in part by a hypervisor (e.g., hypervisor $785_{11}$, . . . , hypervisor $785_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers comprise groups of processes and/or resources (e.g., memory, CPU, disk, etc.) that are isolated from the node host computer and other containers. Such executable containers directly interface with the kernel of the host operating system (e.g., host operating system $787_{11}$, . . . , host operating system $787_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 790 by the VMs and/or the executable containers.

Multiple instances of such virtualized controllers can coordinate within a cluster to form the distributed storage system 792 which can, among other operations, manage the storage pool 790. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $781_{11}$ can interface with a controller virtual machine (e.g., virtualized controller $782_{11}$) through hypervisor $785_{11}$ to access data of storage pool 790. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 792. For example, a hypervisor at one node in the distributed storage system 792 might correspond to software from a first vendor, and a hypervisor at another node in the distributed storage system 792 might correspond to a second software vendor. As another virtualized controller implementation example, executable containers can be used to implement a virtualized controller (e.g., virtualized controller $782_{1M}$) in an operating system virtualization environment at a given node. In this case, for example, the virtualized entities at node $781_{1M}$ can access the storage pool 790 by interfacing with a controller container (e.g., virtualized controller $782_{1M}$) through hypervisor $785_{1M}$ and/or the kernel of host operating system $787_{1M}$.

In certain embodiments, one or more instances of an agent can be implemented in the distributed storage system 792 to facilitate the herein disclosed techniques. Specifically, agent $784_{11}$ can be implemented in the virtualized controller $782_{11}$, and agent $784_{1M}$ can be implemented in the virtualized controller $782_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

As earlier described, the problems attendant to amalgamating resource usage measurements taken from multiple public computing clouds can be addressed in the context of the foregoing implementations. Moreover, any aspect or aspects of taking and combining resource usage measurements as time-metered software that is executing across two distinct public computing clouds can be implemented in the context of the foregoing environments. More specifically, any portion of the foregoing multi-cloud resource usage module and/or the foregoing licensing and provisioning facility, and/or any mechanism for managing a pool of floating licenses can be implemented in whole or in part in an agent (e.g., agent $784_{11}$, agent $784_{1M}$).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor, causes a set of acts comprising:
   adding a license to a pool of licenses, wherein the license is available for allocation to a to be deployed workload on any one of a plurality of nodes;

determining, using a placement module, a placement location for a workload to be deployed as a virtual machine;

placing the workload as the virtual machine onto a node of the plurality of nodes based on the determined placement location, wherein the virtual machine is associated with the license previously added to the pool of licenses and the license comprises a pre-purchased license; and determining, using the placement module, a second placement location for a second workload to be deployed as a second virtual machine where the second workload uses a subscription-based license, wherein time-metering is performed for the second workload on a corresponding central processing unit.

2. The non-transitory computer readable medium of claim 1, wherein the placement location comprises a public cloud computing infrastructure.

3. The non-transitory computer readable medium of claim 2, wherein the placement location comprises a private cloud computing infrastructure on-premises of an enterprise that uses the private cloud computing infrastructure.

4. The non-transitory computer readable medium of claim 1, wherein the placement location is selected from a hybrid cloud comprising at least two cloud computing infrastructures.

5. The non-transitory computer readable medium of claim 4, wherein the hybrid cloud comprises a private cloud computing infrastructure and a public cloud computing infrastructure.

6. The non-transitory computer readable medium of claim 1, wherein the second virtual machine is deployed with metering software.

7. The non-transitory computer readable medium of claim 6, wherein the metering software is within the second virtual machine.

8. The non-transitory computer readable medium of claim 1, wherein the placement location comprises a public cloud computing infrastructure and the second placement location comprises a private cloud computing infrastructure on-premises of an enterprise that uses the private cloud computing infrastructure.

9. A method comprising:

adding a license to a pool of licenses, wherein the license is available for allocation to a to be deployed workload on any one of a plurality of nodes;

determining, using a placement module, a placement location for a workload to be deployed as a virtual machine;

placing the workload as the virtual machine onto a node of the plurality of nodes based on the determined placement location, wherein the virtual machine is associated with the license previously added to the pool of licenses and the license comprises a pre-purchased license; and determining, using the placement module, a second placement location for a second workload to be deployed as a second virtual machine where the second workload uses a subscription-based license, wherein time-metering is performed for the second workload on a corresponding central processing unit.

10. The method of claim 9, wherein the placement location comprises a public cloud computing infrastructure.

11. The method of claim 9, wherein the placement location comprises a private cloud computing infrastructure on-premises of an enterprise that uses the private cloud computing infrastructure.

12. The method of claim 9, wherein the placement location is selected from a hybrid cloud comprising at least two cloud computing infrastructures.

13. The method of claim 12, wherein the hybrid cloud comprises a private cloud computing infrastructure and a public cloud computing infrastructure.

14. The method of claim 9, wherein the second virtual machine is deployed with metering software.

15. The method of claim 14, wherein the metering software is within the second virtual machine.

16. The method of claim 9, wherein the placement location comprises a public cloud computing infrastructure and the second placement location comprises a private cloud computing infrastructure on-premises of an enterprise that uses the private cloud computing infrastructure.

17. A system comprising:

a storage medium having stored thereon a sequence of instructions; and a processor that executes the sequence of instructions to cause the processor to perform acts comprising:

adding a license to a pool of licenses, wherein the license is available for allocation to a to be deployed workload on any one of a plurality of nodes;

determining, using a placement module, a placement location for a workload to be deployed as a virtual machine;

placing the workload as the virtual machine onto a node of the plurality of nodes based on the determined placement location, wherein the virtual machine is associated with the license previously added to the pool of licenses and the license comprises a pre-purchased license; and determining, using the placement module, a second placement location for a second workload to be deployed as a second virtual machine where the second workload uses a subscription-based license, wherein time-metering is performed for the second workload on a corresponding central processing unit.

18. The system of claim 17, wherein the placement location comprises a public cloud computing infrastructure.

19. The system of claim 17, wherein the placement location comprises a private cloud computing infrastructure on-premises of an enterprise that uses the private cloud computing infrastructure.

20. The system of claim 17, wherein the placement location is selected from a hybrid cloud comprising at least two cloud computing infrastructures.

21. The system of claim 20, wherein the hybrid cloud comprises a private cloud computing infrastructure and a public cloud computing infrastructure.

22. The system of claim 17, wherein the second virtual machine is deployed with metering software.

23. The system of claim 22, wherein the metering software is within the second virtual machine.

24. The system of claim 17, wherein the placement location comprises a public cloud computing infrastructure and the second placement location comprises a private cloud computing infrastructure on-premises of an enterprise that uses the private cloud computing infrastructure.

* * * * *